US010958014B1

(12) United States Patent
Martin et al.

(10) Patent No.: US 10,958,014 B1
(45) Date of Patent: Mar. 23, 2021

(54) BLIND MATE MECHANISM

(71) Applicant: United States of America as represented by the Administrator of NASA, Washington, DC (US)

(72) Inventors: Elliott Martin, Greenbelt, MD (US); William Davies, Lanham, MD (US); Michael Liszka, Greenbelt, MD (US); Christopher Lashley, Beltsville, MD (US); Charles Bacon, Greenbelt, MD (US); Patrick O'Neill, Beltsville, MD (US); David Parker, Reston, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/579,092

(22) Filed: Sep. 23, 2019

(51) Int. Cl.
*H01R 13/631* (2006.01)
*B25J 11/00* (2006.01)
*H01R 13/621* (2006.01)

(52) U.S. Cl.
CPC ........ *H01R 13/6315* (2013.01); *B25J 11/005* (2013.01); *H01R 13/6215* (2013.01)

(58) Field of Classification Search
CPC .............. H01R 13/621; H01R 13/6215; H01R 13/6315; B25J 11/005
See application file for complete search history.

(56) References Cited

U.S. PATENT DOCUMENTS

| 5,266,047 | A  | * | 11/1993 | Black ................... | H01R 13/631 |
| | | | | | 439/364 |
| 5,743,756 | A  | * | 4/1998 | Hasz ................... | H01R 13/4367 |
| | | | | | 439/364 |
| 7,465,195 | B1 | * | 12/2008 | Kerrigan ................ | H01R 12/52 |
| | | | | | 439/607.05 |
| 7,740,489 | B2 | * | 6/2010 | Trout ................. | H01R 12/7011 |
| | | | | | 439/75 |
| 9,531,118 | B2 | * | 12/2016 | Byrne ................ | H01R 13/6205 |
| 10,164,373 | B1 | * | 12/2018 | Cheon .................. | H01R 13/005 |
| 10,205,279 | B2 | * | 2/2019 | Endo ..................... | H01R 12/732 |
| 10,498,061 | B1 | * | 12/2019 | Blasick .............. | H01R 13/6315 |
| 2007/0167083 | A1 | * | 7/2007 | Mineo .................. | G01R 1/0416 |
| | | | | | 439/638 |
| 2015/0036359 | A1 | * | 2/2015 | Chen ................... | F21V 23/0471 |
| | | | | | 362/368 |
| 2015/0333446 | A1 | * | 11/2015 | Yuan .................. | H01R 13/6315 |
| | | | | | 439/248 |
| 2018/0209456 | A1 | * | 7/2018 | Antosh ................ | H01R 13/621 |
| 2018/0261957 | A1 | * | 9/2018 | Li ......................... | G06F 1/1681 |
| 2019/0123479 | A1 | * | 4/2019 | Lim ..................... | H01R 13/521 |
| 2019/0221969 | A1 | * | 7/2019 | Ruffini ................ | H01R 13/633 |
| 2019/0229450 | A1 | * | 7/2019 | Russo ............... | H01R 13/6215 |
| 2019/0369681 | A1 | * | 12/2019 | Chai .................. | H01R 13/6315 |
| 2020/0059054 | A1 | * | 2/2020 | Hsu ...................... | H01R 13/631 |

* cited by examiner

*Primary Examiner* — Oscar C Jimenez
(74) *Attorney, Agent, or Firm* — Matthew F. Johnston; Bryan A. Geurts; Helen M. Galus

(57) ABSTRACT

Blind mate mechanisms that are capable of simultaneously making multiple connections in a single motion are disclosed. Such mechanisms may be useful for applications where two or more of structural, electrical, and/or fluid couplings could be made manually or robotically at the same time using the mechanism. The mechanism may include a removable side and a fixed side.

17 Claims, 36 Drawing Sheets

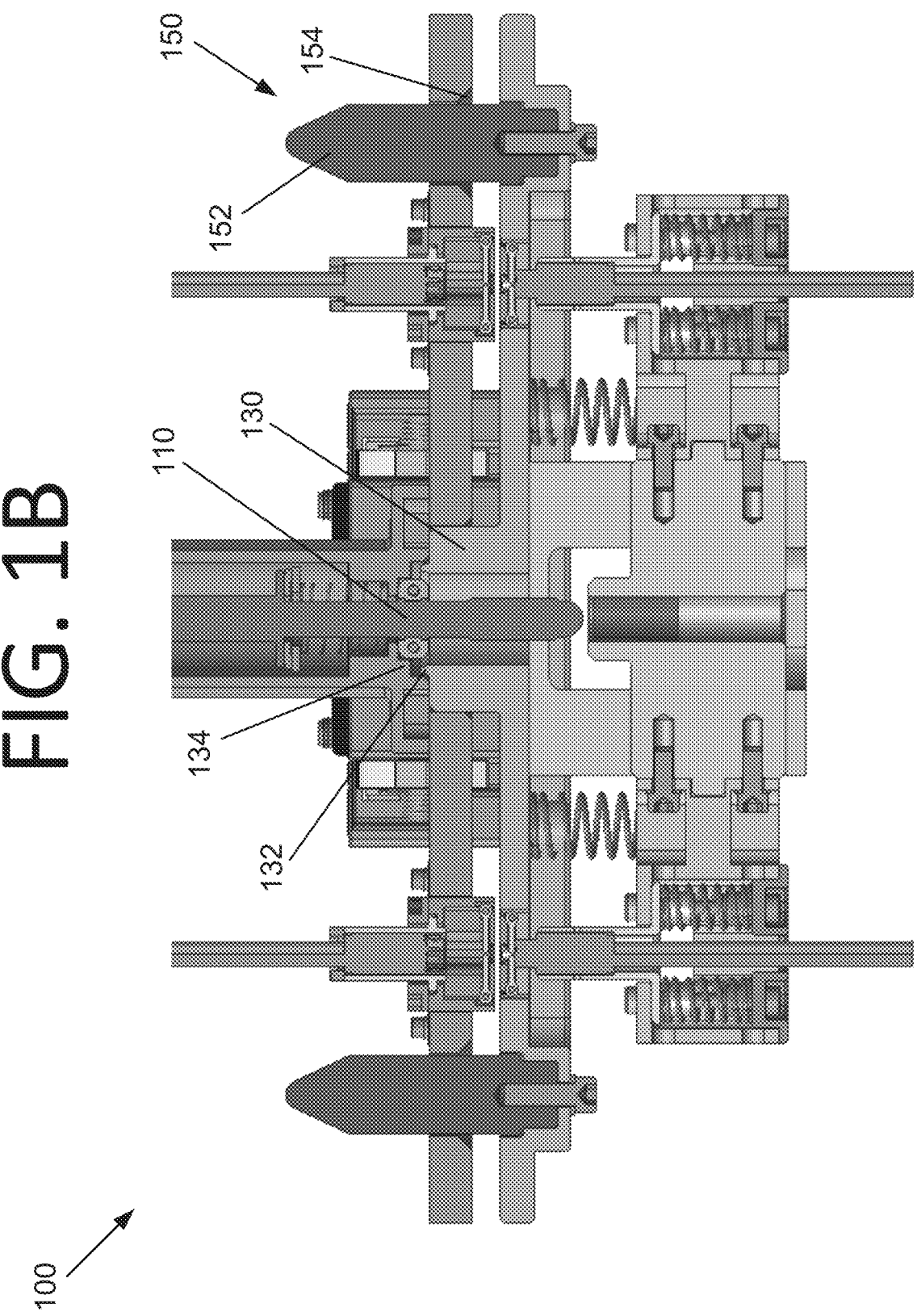

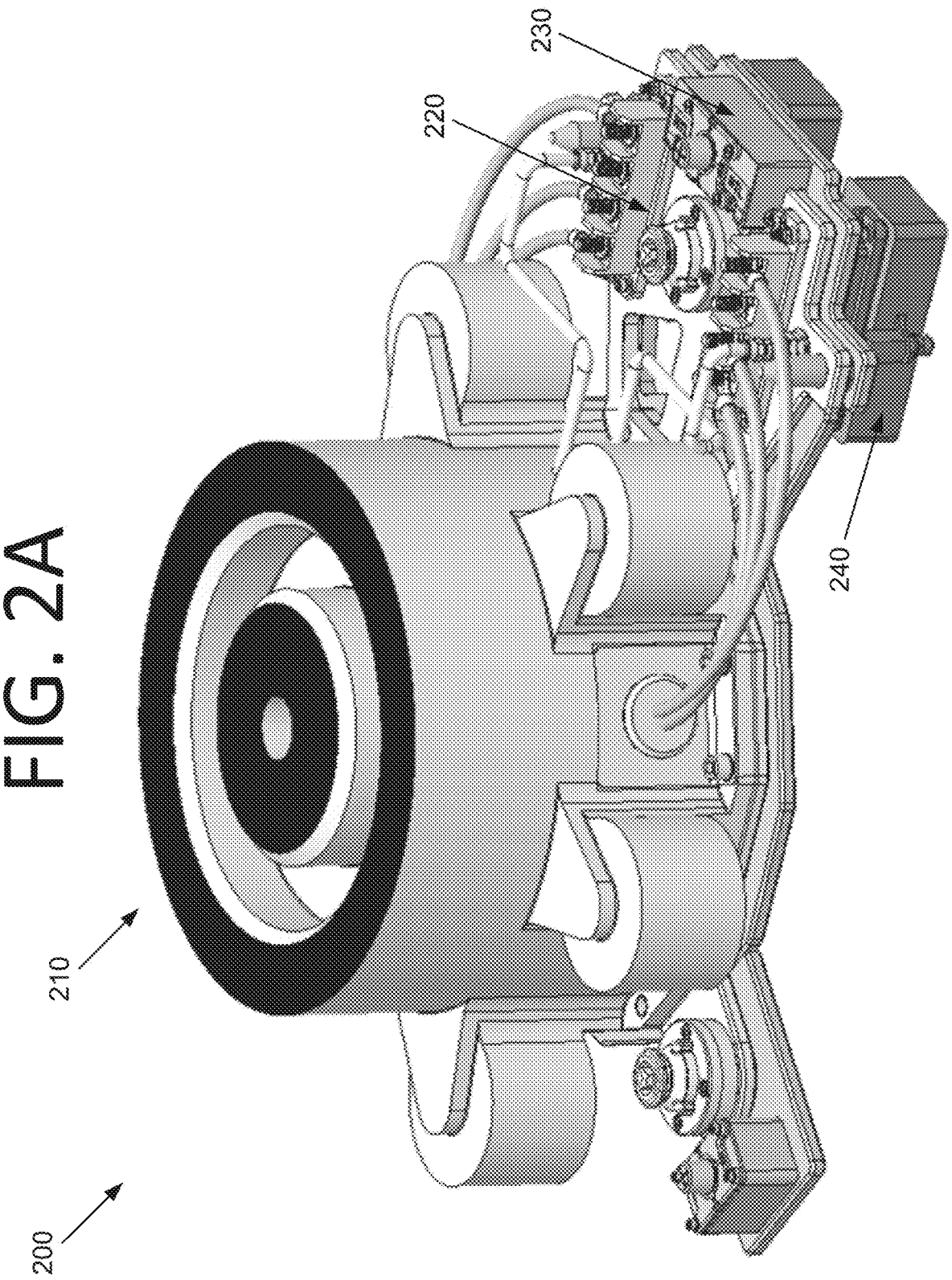

FIG. 3C
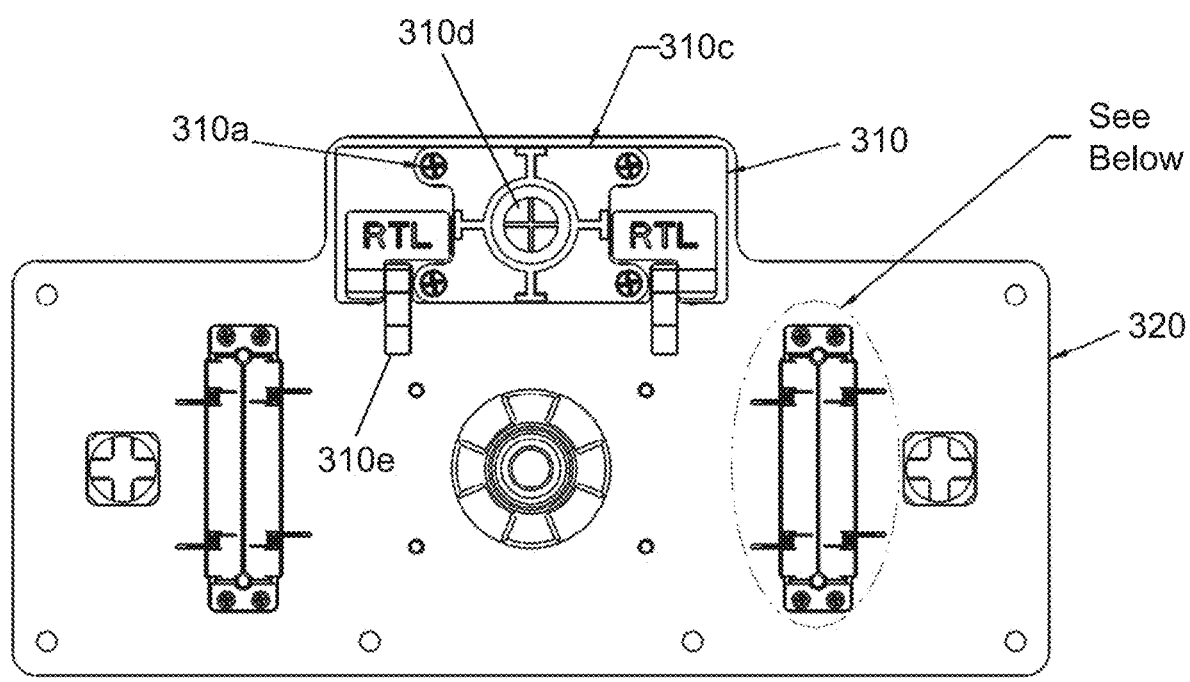
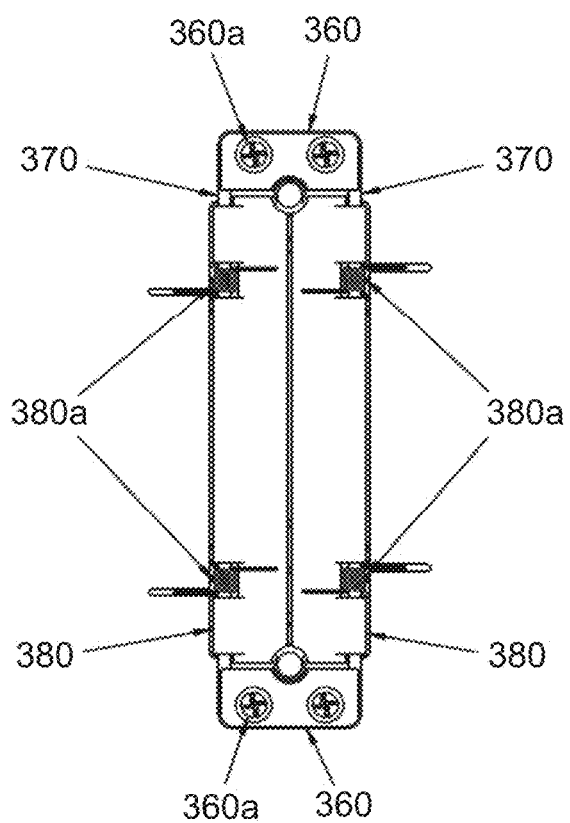

340

FIG. 3M
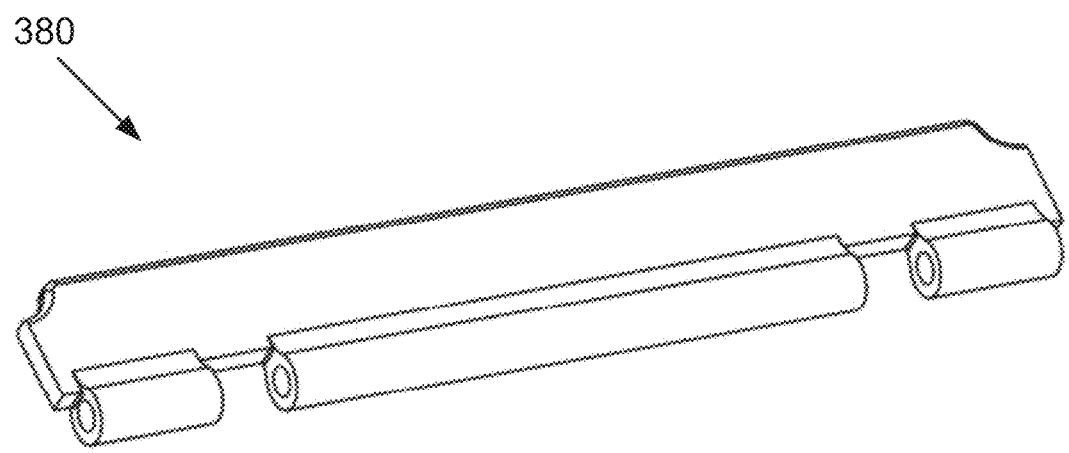
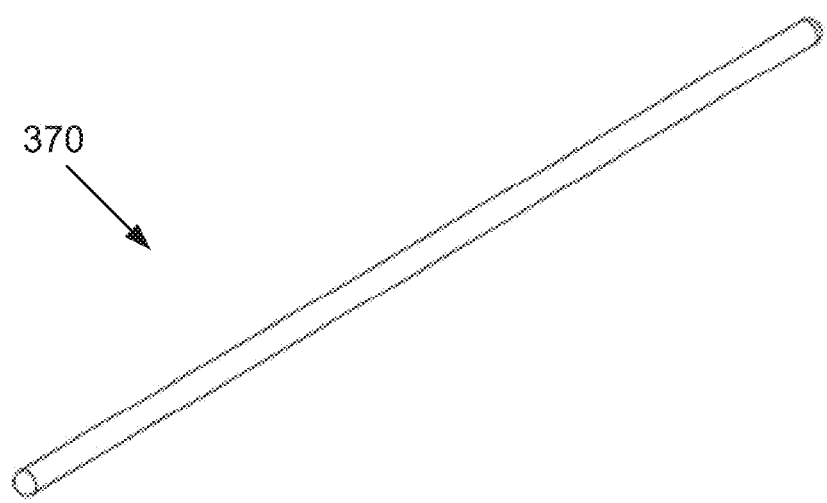

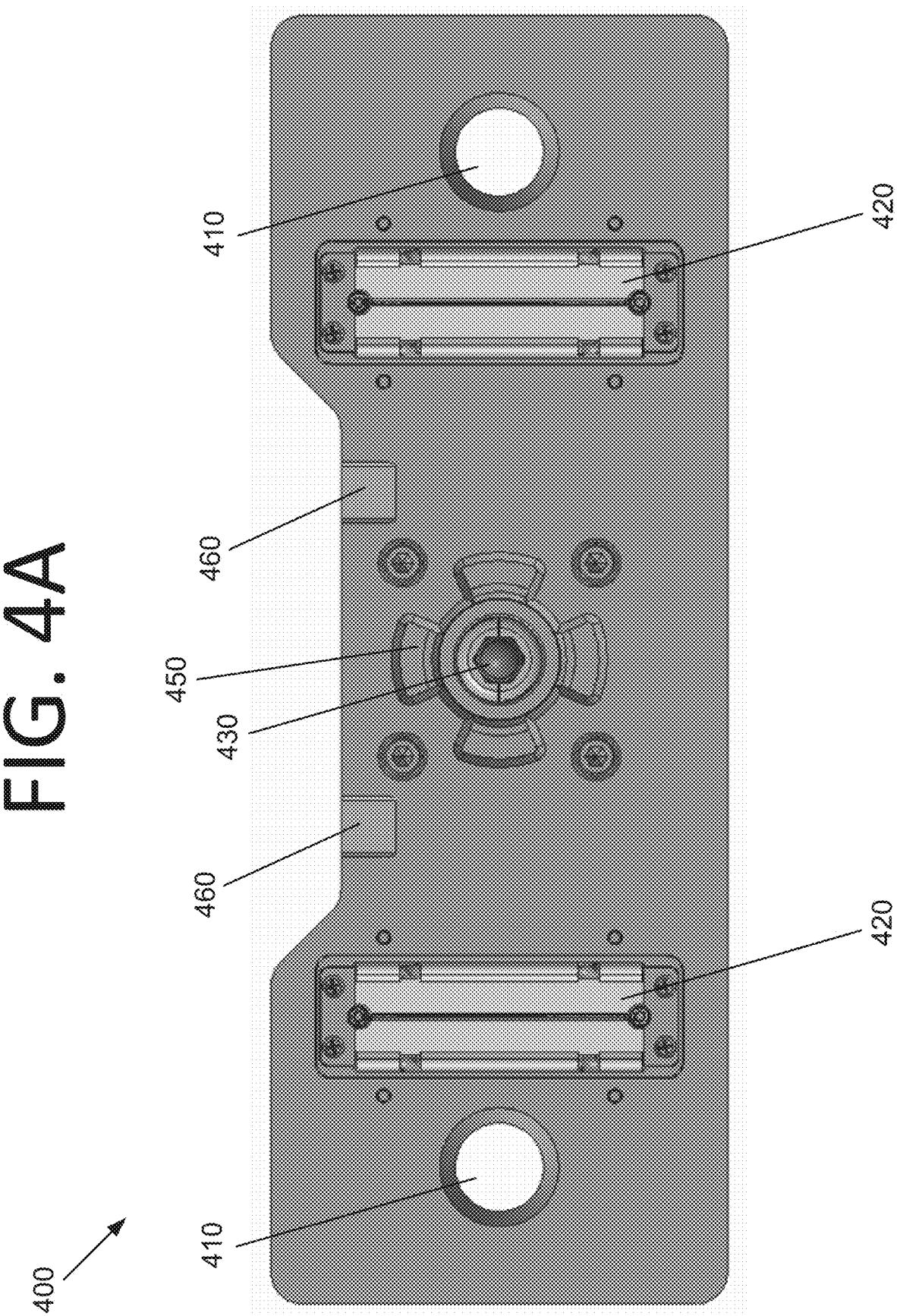

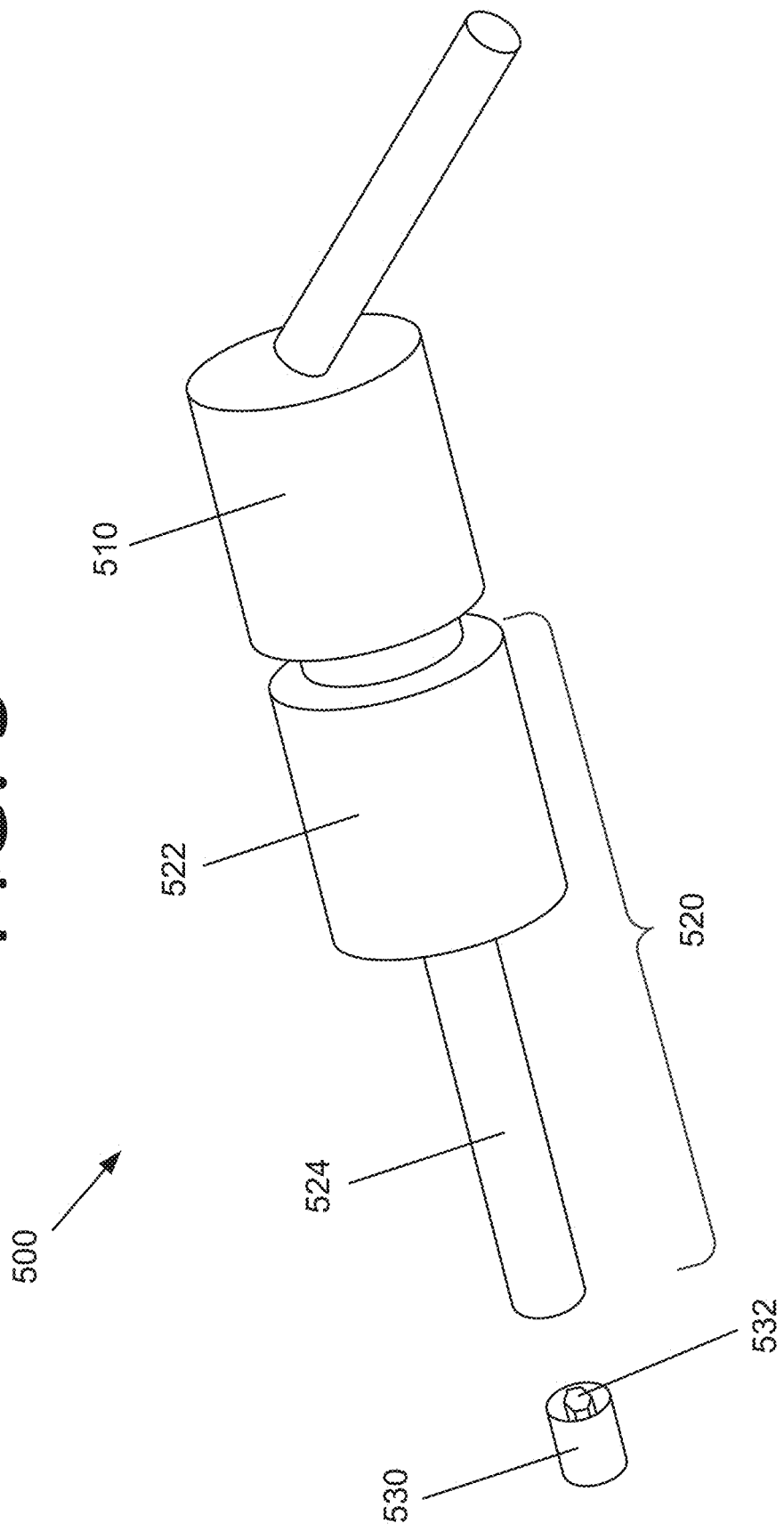

BLIND MATE MECHANISM

STATEMENT OF FEDERAL RIGHTS

The invention described herein was made by employees of the United States Government and may be manufactured and used by or for the Government for Government purposes without the payment of any royalties thereon or therefore.

FIELD

The present invention generally relates to coupling, and more specifically, to a blind mate mechanism that may be capable of simultaneously making multiple connections in a single motion.

BACKGROUND

Modules, tools, or other types of hardware may need to be connected by a robot or manually to accomplish assembly or servicing tasks. When working in harsh environments such as space, robots should be enabled to make these kinds of connections without human intervention. However, reliable robot-friendly mechanisms that allow structural, electrical, and/or fluid connections to be made are not conventionally available. Indeed, connections in space are typically made by astronauts. Also, a mechanism that allows humans to make simultaneous connections is not provided. Accordingly, an improved mechanism may be beneficial.

SUMMARY

Certain embodiments of the present invention may provide solutions to the problems and needs in the art that have not yet been fully identified, appreciated, or solved by conventional coupling technologies. For example, some embodiments pertain to a blind mate mechanism that may be capable of simultaneously making multiple connections in a single motion.

In an embodiment, a blind mate mechanism includes a removable side. The removable side includes a drive bolt and one or more first connectors. The blind mate mechanism also includes a fixed side operably connected to a device to be serviced. The fixed side includes a threaded receiving interface configured to receive the drive bolt and one or more second connectors configured to connect with the one or more first connectors. The removable side is configured to be mated with the fixed side and de-mated with the fixed side. The fixed side and the removable side are configured to facilitate mechanical and structural connections, transfer of fluids, transfer of communications signals, transfer of power, or any combination thereof, between the fixed side and the removable side via the one or more first connectors and the one or more second connectors when the fixed side and the removable side are mated.

In another embodiment, an apparatus includes a threaded receiving interface configured to receive a drive bolt and one or more connectors. The apparatus also includes a carriage including a threaded receiving interface configured to receive the drive bolt and connector over-travel protectors configured to prevent the one or more connectors from overextension or overcompression.

In yet another embodiment, an apparatus includes one or more connectors, a drive bolt housing, and a drive bolt housed within the drive bolt housing. The drive bolt includes a retainer configured to retain the drive bolt within the drive bolt housing and a stopping projection configured to contact a narrowing portion of the drive bolt housing, limiting how far the drive bolt can extend. The drive bolt also includes a spring located between the stopping projection and the narrowing part of the drive bolt housing.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1B is a side cutaway view illustrating the robot driven blind mate mechanism of FIG. 1A in a fully seated phase, according to an embodiment of the present invention.

FIG. 2A is a perspective view illustrating an electric propulsion (EP) thruster assembly, according to an embodiment of the present invention.

FIG. 3C illustrates top view of a mounting pad and a status indicator, as well as a closeup of the flaps for a female connector, all in the unmated configuration according to an embodiment of the present invention.

FIG. 3M illustrates perspective views of a pin and a flap, according to an embodiment of the present invention.

FIG. 3O is a top view illustrating the carriage, according to an embodiment of the present invention.

FIG. 4A is a bottom view illustrating a removable side of a robot-driven blind mate mechanism that contacts the fixed side when being mated, according to an embodiment of the present invention.

FIG. 5 is a perspective view illustrating a robot configured to interface with a robot grasp point of a change-out assembly, according to an embodiment of the present invention.

DETAILED DESCRIPTION OF THE EMBODIMENTS

Figure 1A:
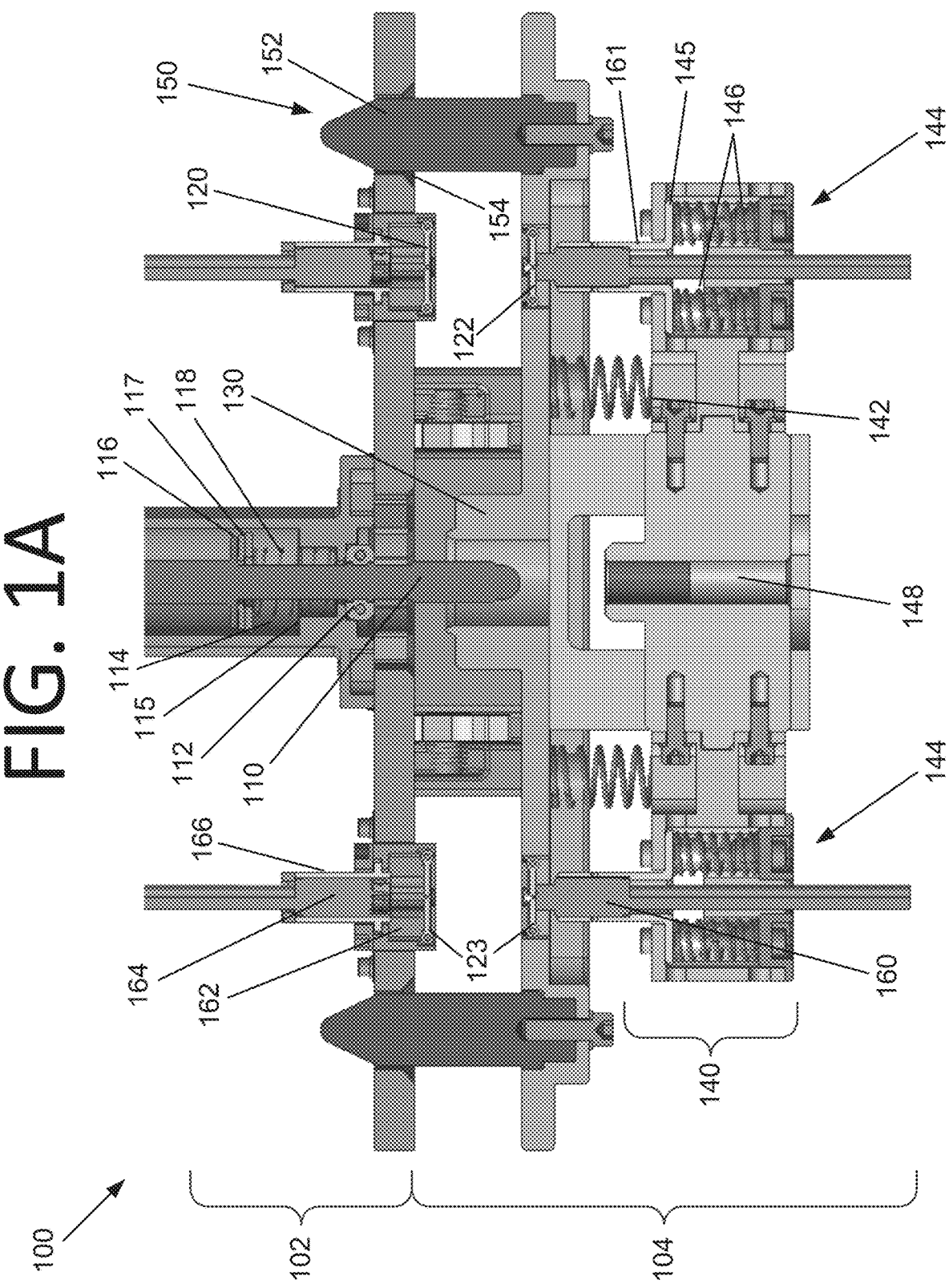
FIG. 1A is a side cutaway view illustrating a robot driven blind mate mechanism in a coarse alignment phase, according to an embodiment of the present invention.

Some embodiments of the present invention pertain to a blind mate mechanism that may be capable of simultaneously making multiple connections (e.g., electrical, fluid, and/or structural connections) in a single motion. The blind mate mechanism may be driven by a robot or operated by a human (such as a human operator in a servicing crew of a payload processing facility). This is advantageous because in some embodiments, a structural connection happens at the same time as a fluid/electrical connection. For example, a human or robot may not need to bolt on a box, thruster, or other component and then mate the connectors in a separate operation. Rather, this may all occur at the same time. A single drive bolt holds everything in place in some embodiments. However, for heavy components or those exposed to high levels of vibration, additional bolts may be fastened for extra structural security, if so desired.

In some embodiments, the mechanism is designed to operate in the harsh environment of space. Such a mechanism may be useful for applications where two or more of structural, electrical, and/or fluid couplings could be made robotically at the same time using the interface. Applications include, but are not limited to, on-orbit replacement units, deep sea assembly and repair work where it is not feasible or too dangerous for humans to work, underground or undersea robotic mining and drilling, etc.

For instance, in space, solar electric propulsion (SEP) thrusters (e.g., Hall thrusters) could be replaced on-orbit, extending the operations lifetime of a space vehicle or space station. While in-space refueling with xenon is being demonstrated for high-pressure SEP systems, the operational lifetime of SEP thrusters is still finite due to sputter erosion of the ceramic discharge chamber of the thruster itself, which is caused by high energy ions in the exhaust stream. Hall thrusters typically have an operating lifetime of roughly 10,000 hours (417 days), with magnetic shielding increasing the life to approximately 25,000 hours (1,042 days). For NASA's planned lunar-orbiting crew-tended gateway and Deep Space Transport (DST), this operational lifetime is insufficient, and thrusters will need to be replaced. Replacement of such thrusters facilitated by some embodiment thus provides advantages over conventional xenon refueling.

The mechanism of some embodiments includes a removable side and a fixed side. The removable side in some embodiments includes a robot grasp point, a drive bolt, one side of blind mate fluid and electrical couplings (also referred to as "connectors" herein), and one side of interface alignment features. Blind mate connections use a sliding action to mate and de-mate connectors and couplings, which allow for a robot-friendly design. Enough float or play in the connectors may also be provided to accommodate a certain degree of misalignment during robot operations. Coarse and fine alinement features may be used to assist with the mate and de-mate process in both the blind mate mechanism and throughout the interface hardware.

The fixed side in some embodiments includes corresponding alignment features and a carriage. The carriage may house the corresponding fluid and electrical couplings and over-travel protection for the couplings. In some embodiments, the robot system that uses the interface may dictate the specific type of robot grasp point, any required targets (e.g., visual targets for the robot), and mechanism status indicators.

A novel aspect of some embodiments lies in the creation of a new interface that incorporates structural, electrical, and/or fluid couplings into a robot driven blind mate mechanism. The mate and de-mate forces in some embodiments are carefully balanced throughout the mechanism so it can be actuated with one motion, such as by turning a single drive bolt (e.g., drive bolt 110 of FIGS. 1A-E, as discussed in more detail below). The point at which the different connectors seat may be carefully controlled by proper spacing and the spring forces distributed throughout the mechanism. For example, in some embodiments, the electrical connectors can make contact before the fluid couplings, if desirable, to accommodate the relatively long length of high voltage and current pins in some designs. The springs that compress to provide over-travel protection on the electrical connectors in some embodiments allow for preload to be developed between the removable side and fixed side of the interface to create a sound structural connection while not over-stressing the connectors.

Over-travel protection can be applied to fluid couplings as needed in some embodiments, depending on the specific coupling that is used. Some embodiments are versatile and can be tailored to a wide range of fluid and electrical couplings, and thus can be utilized in a wide range of applications. Some embodiments are useful for removing or installing Orbital Replacement Units (ORUs), for example.

FIG. 1A is a side cutaway view illustrating a robot driven blind mate mechanism 100 in a coarse alignment phase, according to an embodiment of the present invention. In this embodiment, only electrical and structural connections are provided. However, any desired number and/or type of connections, and any desired connection locations, may be provided without deviating from the scope of the invention.

Mechanism 100 includes a removable side 102 and a fixed side 104. Fixed side 104 is attached to the device to be serviced. Removable side 102 is operably connected to a robot (not shown) and includes a drive bolt 110 and upper dust/debris gates 120. Drive bolt 110 is configured to be driven by the robot into a fine alignment feature 130 and a carriage 140 of fixed side 104. Drive bolt 110 includes a retainer 112 (e.g., a clamshell retainer) that retains drive bolt 110 within drive bolt housing 114. A stopping projection 116 in concert with washers 117 in this embodiment control how far drive bolt 110 may extend in a downward direction when washers 117 (or stopping projection 116 if no washers 117 are included) contact a narrowing part 115 of drive bolt housing 114.

A spring 118 is captured between narrowing part 115 and washers 117. Spring 118 biases drive bolt 110 such that drive bolt 110 is resting on retainer 112. This keeps drive bolt 110 out of the way until it is to be used to fully seat removable side 102 upon fixed side 104. Also, this places the head of drive bolt 110 in a predictable position for when the robot tool engages the bolt head. Stopping projection 116 also provides a bearing surface through which the tensile load is transferred.

Coarse alignment features 150 includes projections 152 of fixed side 104 and corresponding holes 154 of removable side 102. However, in some embodiments, the locations of projections 152 and holes 154 may be reversed, or one or more projections 152 may be on each of removable side 102 and fixed side 104, while one or more corresponding holes are located on the opposite side.

Fixed side 104 includes lower dust/debris gates 122. Fixed side 104 also includes carriage 140 that carries female electrical connectors 160 and allows drive bolt 110 to drive female electrical connectors 160 and male electrical connectors 164 together into a mated configuration. Carriage 140 also provides the opposing bearing surface that completes the bolted connection.

Carriage 140 includes carriage return springs 142 that are operably connected to fine alignment feature 130 and bias carriage 140 in a downward direction therefrom with respect to the orientation of FIG. 1A. Carriage 140 also includes connector over-travel protectors 144 that prevent female electrical connectors 160 (housed within female connector housings 161) that pass therethrough from extending too far into upper dust/debris gates 122 and onward into male electrical connectors 164 via springs 146. Over-travel protectors 144 prevent female electrical connectors 160 from traveling too far via lower movement limiting posts 145, upper movement limiting posts 166, and springs 146. Springs 146 are connected to lower movement limiting posts 145. Springs 146 compress to provide over-travel protection for female electrical connectors 160 and allow for preload to be developed between removable side 102 and fixed side 104 to create a sound structural connection while not over-stressing female electrical connectors 160 and male electrical connectors 164.

Carriage 140 additionally includes a threaded receiving interface 148 that houses drive bolt 110 when removable side 102 and fixed side 104 are connected. In some embodiments, carriage 140 houses fluid and/or electrical couplings, and houses female electrical connectors 160 here. Connector housings 162 house and contain male electrical connectors 164.

FIG. 1B shows robot driven blind mate mechanism 100 in a fully seated phase, where removable side 102 is fully seated upon fixed side 104. In this phase, the robot presses removable side 102 against fixed side 104. Projections 152 of coarse alignment features 150 extend through respective holes 154. Also, prongs 132 of fine alignment feature 130 extend into and engage with fine alignment feature receiver 134 that is formed from the same piece as drive bolt housing 114 in this embodiment. However, it should be noted that while in this embodiment fine alignment feature is cruciform and includes prongs 132, in some embodiments, a different geometry is used. Indeed, any suitable geometry may be used without deviating from the scope of the invention.

Figure 1C:
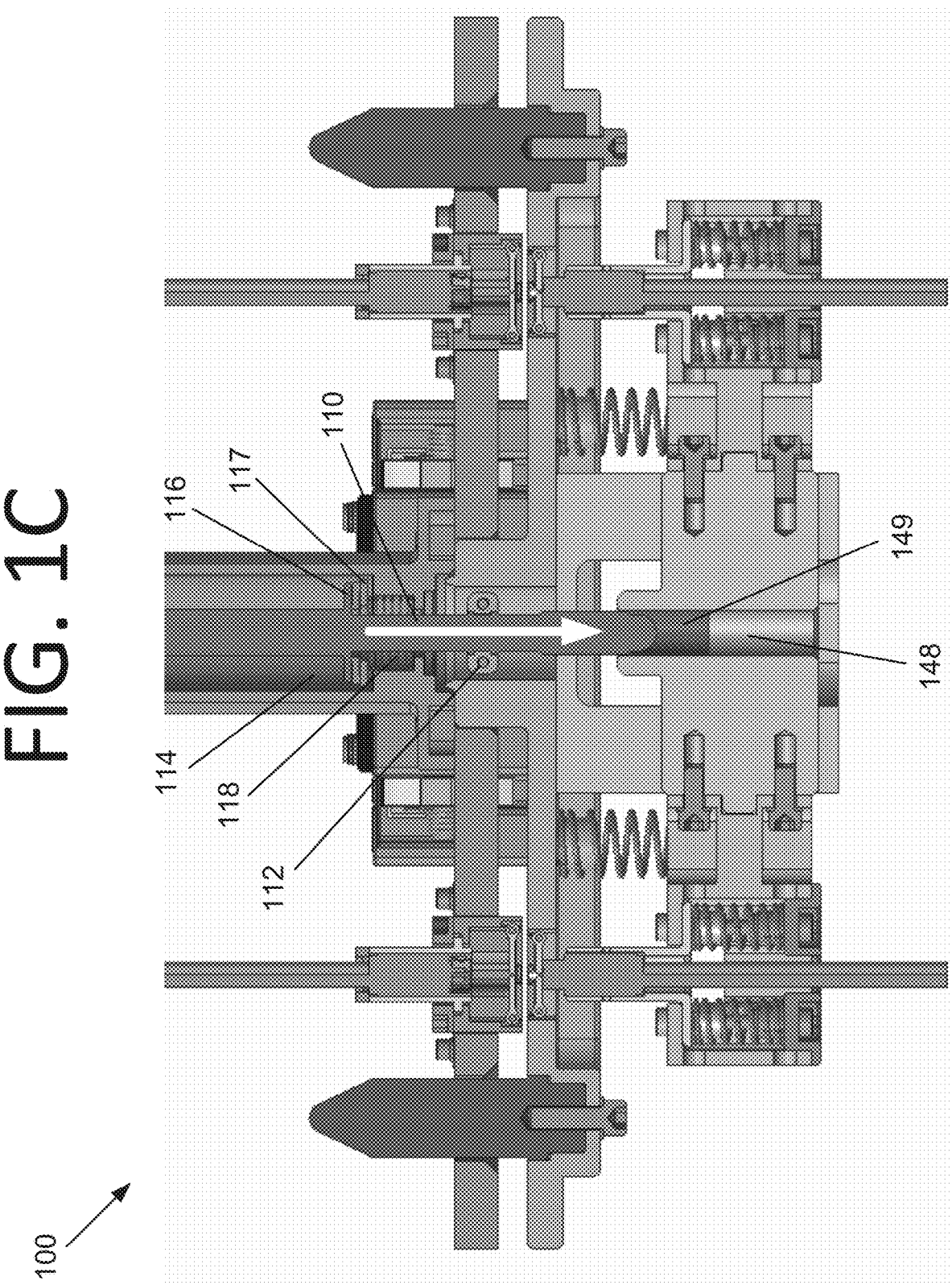
FIG. 1C is a side cutaway view illustrating the robot driven blind mate mechanism of FIG. 1A in a carriage engagement phase, according to an embodiment of the present invention.
Figure 1D:
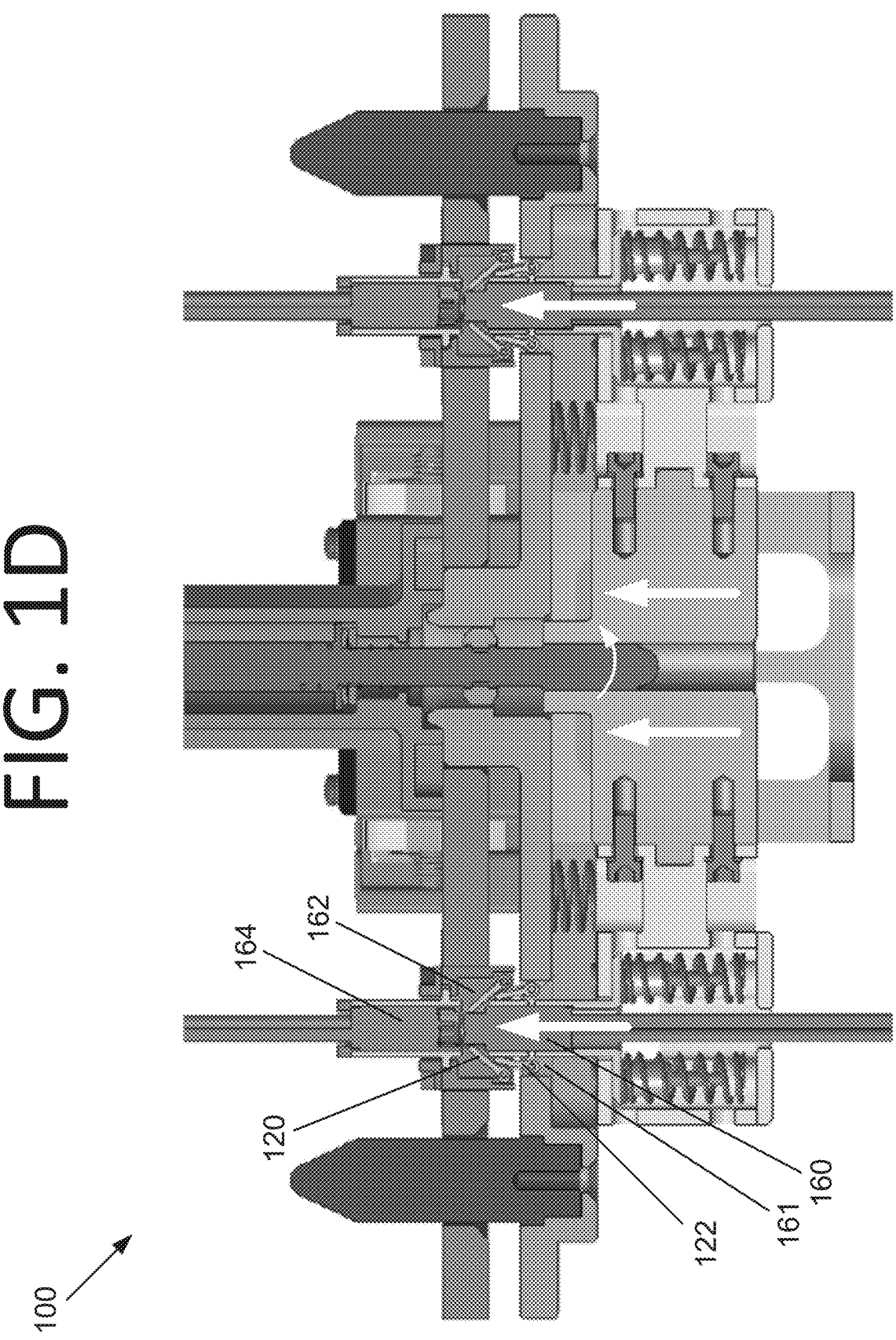
FIG. 1D is a side cutaway view illustrating the robot driven blind mate mechanism of FIG. 1A in a debris gate opening phase, according to an embodiment of the present invention.

Turning to FIG. 1C, once removable side 102 is fully seated on fixed side 104, the robot drives drive bolt 110 into carriage 140 via threaded receiving interface 148 in the direction indicated by the white arrow. The inside of threaded receiving interface 148 is threaded, as is the shank of drive bolt 110, such that drive bolt 110 screws into threaded receiving interface 148. Once engaged with carriage 140, the robot rotates drive bolt 110 within threaded receiving interface 148, causing drive bolt 110 to screw into threaded receiving interface 148. This draws carriage 140 and female electrical connectors 160 towards removable side 102. See FIG. 1D. Another aspect of the function of this mechanism is the additional fine alignment features (i.e., pins, holes, and lateral float) between male connector housing 166 and female connector housing 161. The additional fine alignment features in an embodiment are shown in more detail in FIGS. 3N-V and 4B, for example. Female electrical connectors 160 push lower dust/debris gates 122 and upper dust/debris gates 120 open, and female electrical connectors 160 extend into respective connector housings 162. Naturally, the locations of male electrical connectors 164 and female electrical connectors 160 may be reversed.

Figure 1E:
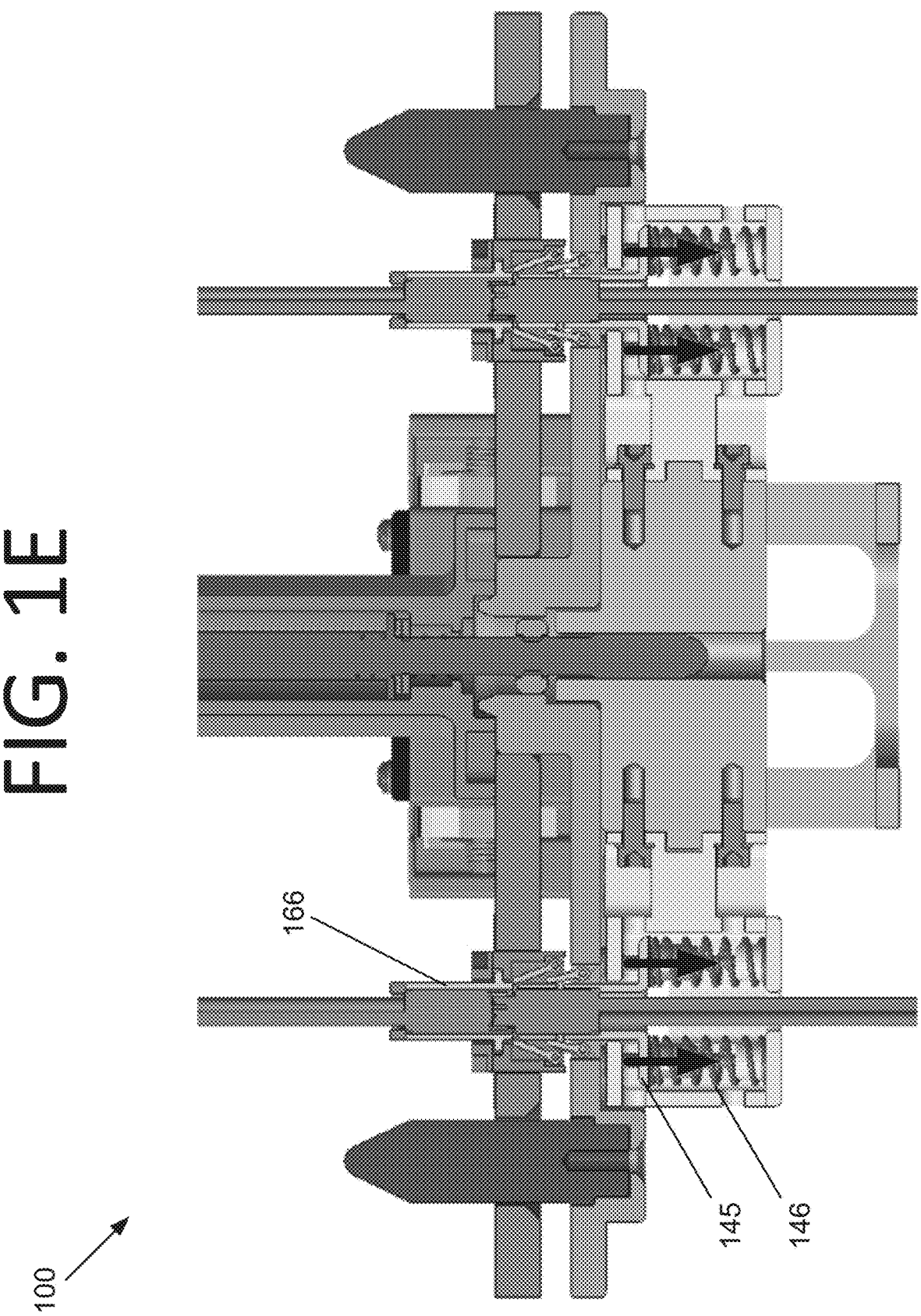
FIG. 1E is a side cutaway view illustrating the robot driven blind mate mechanism of FIG. 1A in a fully connected phase, according to an embodiment of the present invention.

FIG. 1E shows mechanism 100 in the fully connected phase. Here, female electrical connectors 160 and male electrical connectors 164 are fully connected and electrical signals can travel therebetween. Pressing lower movement limiting posts 145 into upper movement limiting posts 166 pushes springs 146 downward in the direction shown by the black arrows, keeping female electrical connectors 160 and male electrical connectors 164 connected and allowing the primary mechanical load path to occur at the interface between the top of carriage 140 and the bottom of fine alignment feature 130.

To disconnect removable side 102 from fixed side 104, the process is performed in reverse, and can be seen by reviewing FIGS. 1E-1A in the opposite order. The robot rotates drive bolt 110 in the opposite direction, which unscrews drive bolt 110 from threaded receiving interface 148. Carriage 140 is biased away from removable side 102 via carriage return springs 142. Female electrical connectors withdraw through lower dust/debris gates 122 and upper dust/debris gates 120, which close due to the action of dust cover springs 123. Once the threads of threaded receiving interface 148 are no longer engaged with drive bolt 110, and the robot "withdraws," spring 118 biases drive bolt away from carriage 140 and out of the way. The robot tool/end effector may still be attached/gripped onto a grapple point of removable side 102, but no longer be pushing in the axial direction on drive bolt 110.

Figure 2B:
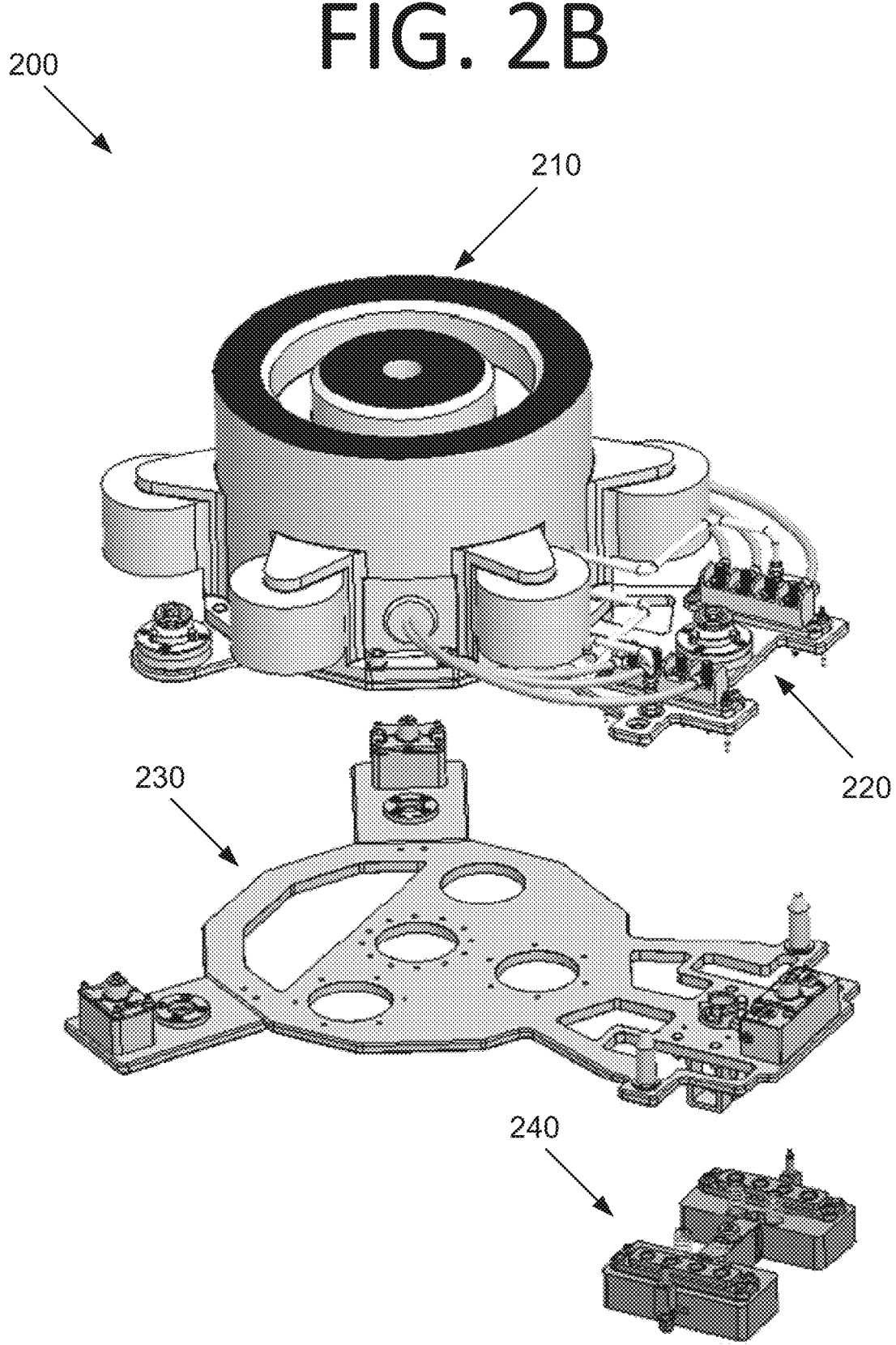
FIG. 2B is an exploded view illustrating the EP thruster assembly of FIG. 2A, according to an embodiment of the present invention.

Per the above, an example implementation of some embodiments is for Hall thrusters. FIG. 2A is a perspective view and FIG. 2B is an exploded view illustrating an electric propulsion (EP) thruster assembly 200, according to an embodiment of the present invention. EP thruster assembly 200 includes an EP thruster 210, a thruster-side interface plate 220, a bus-side interface plate 230, and a carriage 240. EP thruster 210 and thruster-side interface plate 220 constitute a change-out assembly, and bus-side interface plate 230 and carriage 240 constitute a bus-side interface assembly.

Figure 2C:
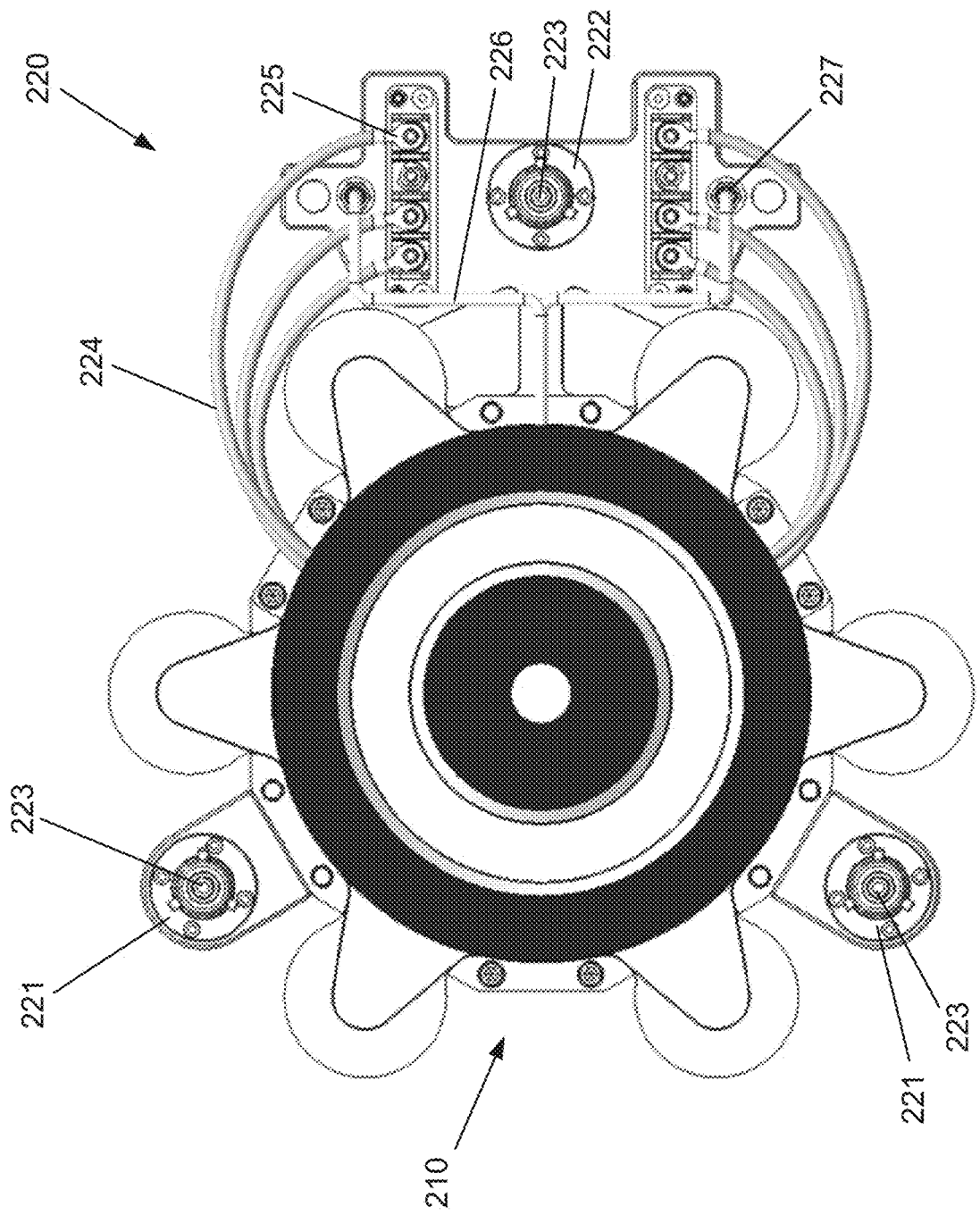
FIG. 2C is a top view illustrating a change-out assembly, according to an embodiment of the present invention.
Figure 2D:
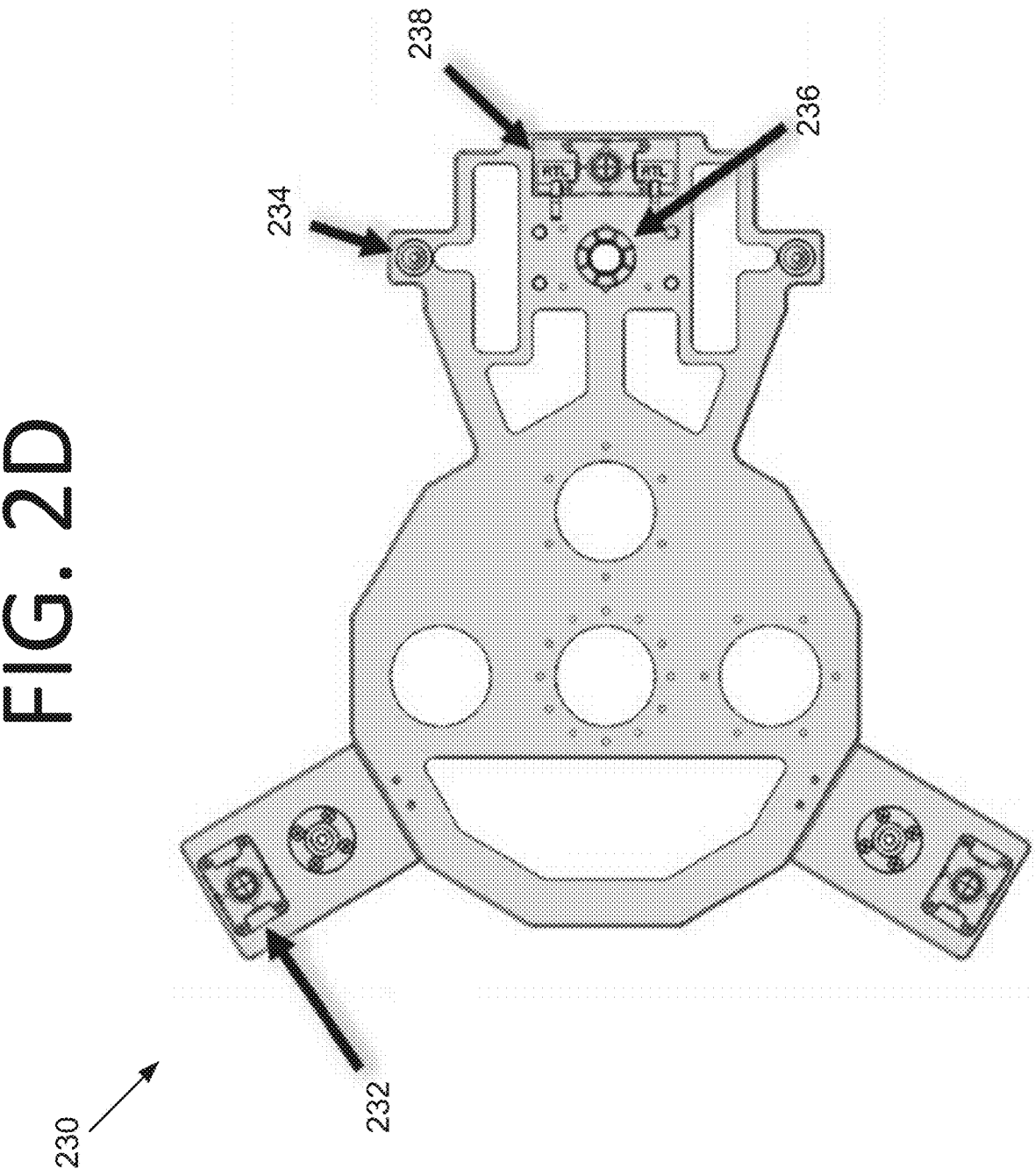
FIG. 2D is a top view illustrating a bus-side interface plate, according to an embodiment of the present invention.

Turning to FIG. 2C, in the change-out assembly, secondary robot grasp points 221 (e.g., micro-conical fixtures (MCFs)) a primary robot grasp point 222 are used in conjunction with visual targets 232 (e.g., modified truncated cone (MTC) visual targets—see FIG. 2D) to allow an end effector of a robot to grab onto and manipulate the thruster change-out assembly in this embodiment. MCFs and MTC targets, for example, have flight heritage from the International Space Station (ISS).

Electrical cables 224 and fluid lines 226 extend from EP thruster 210 and are connected to thruster-side interface plate 220 via male electrical connectors 225 and female fluid couplings 227, respectively. EP thruster 210 is fastened directly to thruster-side interface plate 220 in this embodiment. Male electrical connectors 225 and female fluid couplings 227 have a predetermined amount of float to accommodate for misalignment while the blind mate mechanism is actuated. Primary robot grasp point and secondary robot grasp points 221 provide a mechanism for the robot to attach/remove the change-out assembly via drive bolts 223.

Turning to FIG. 2D, bus-side interface plate 230 includes MCF targets 232 for use by the robot in conjunction with robot grasp points 221, 222 to properly grasp each grasp point 221, 222. Coarse alignment features 234 (e.g., projections or pins) and a fine alignment feature 236 are used by the robot to position the change-out assembly onto the bus-side interface assembly. A ready-to-latch (RTL) indicator 238 is mounted on bus-side interface plate 230 to visually show when the change-out assembly is properly seated on the bus-side interface assembly.

Figure 2E:
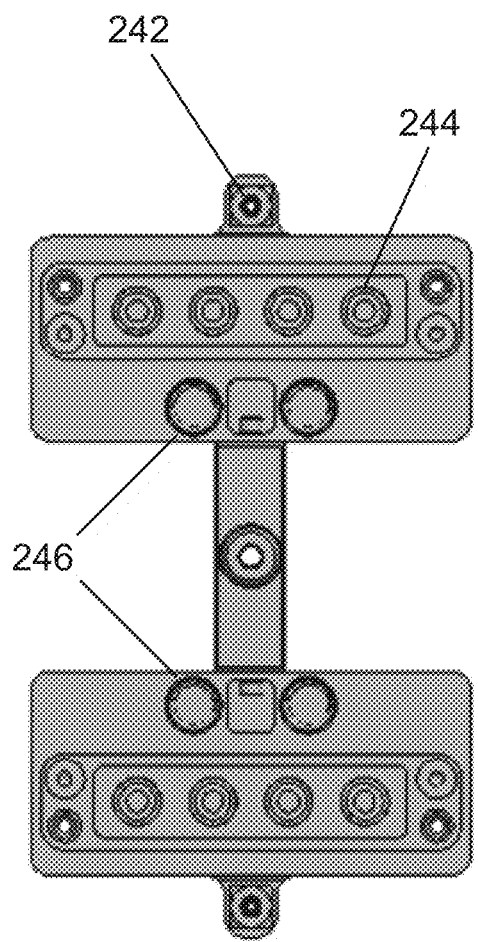
FIG. 2E is a top view illustrating a carriage, according to an embodiment of the present invention.

Turning to FIG. 2E, carriage 240 includes male fluid couplings 242 and female electrical connectors 244. These interface with female fluid couplings 227 and male electrical connectors 225 of bus-side interface plate 230, respectively. Male fluid couplings 242 are mounted to carriage 240 while female electrical connectors 244 have a predetermined amount of float to further accommodate misalignment between the sockets and the electrical pins protruding from the change-out assembly. Male fluid couplings 242 may be rigidly mounted or have some float. Carriage 240 is constrained so it could only travel linearly toward and away from bus-side interface plate 230. Return springs 246 bias carriage 240 away from bus-side interface plate 230 and keep carriage 240 out of the way while not engaged with the change-out assembly.

Figure 2F:
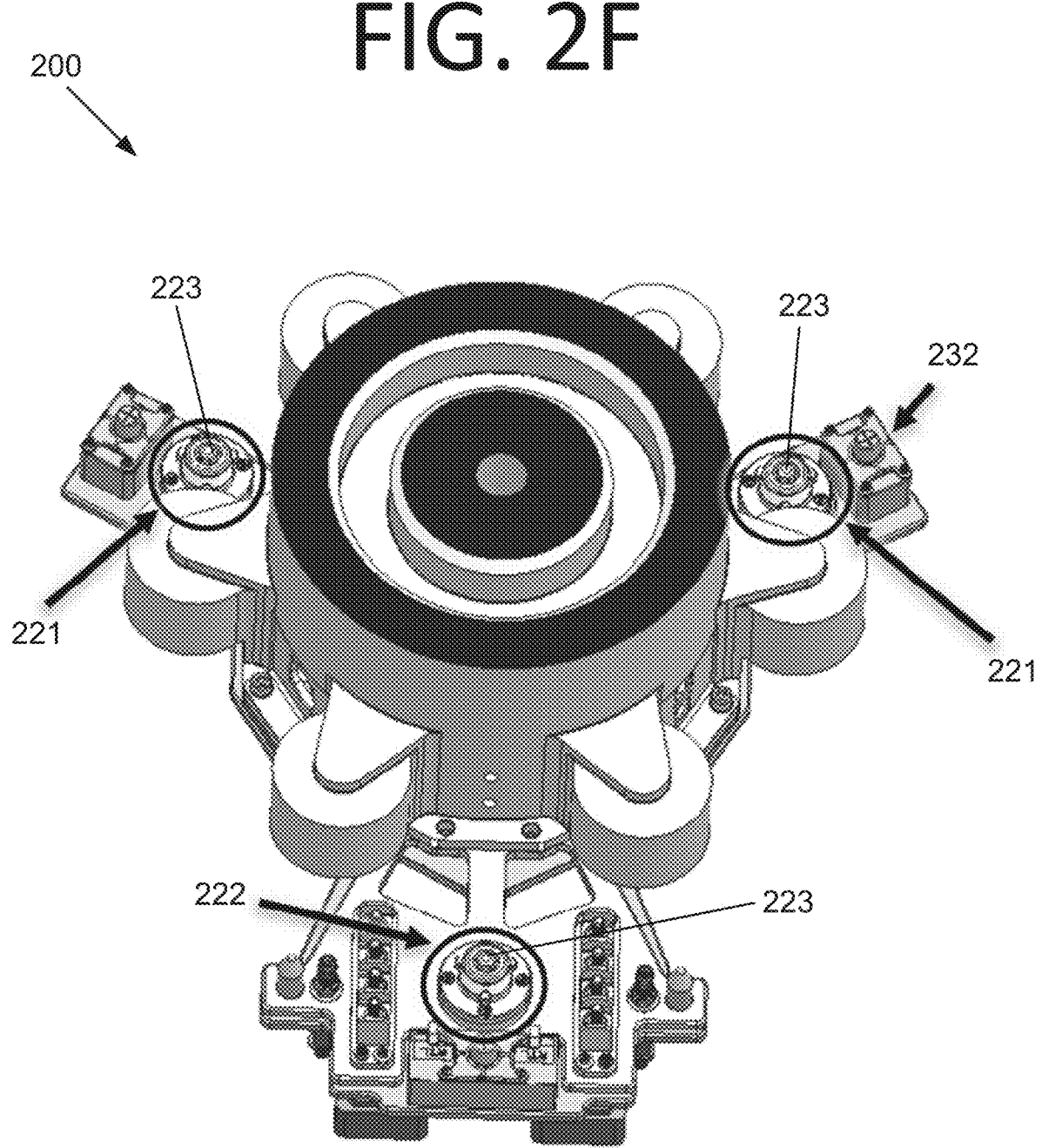
FIG. 2F is another perspective view illustrating the EP thruster assembly of FIG. 2A, according to an embodiment of the present invention.

Turning to FIG. 2F, an end effector of the robot grasps primary robot grasp point 222 and secondary robot grasp points 221, which are circled. The end effector then drives the drive bolts 223 into the bus-side interface assembly to attach the change-out assembly. The blind mate mechanism is actuated in this embodiment by drive bolt 223 located in primary robot grasp point 222.

As drive bolt 223 of primary robot grasp point 222 is threaded into the bus-side interface assembly, carriage 240 is drawn towards bus-side interface plate 230. This action mates fluid couplings 227, 242 and electrical connectors 225, 244. Once some preload develops, the bus-side interface assembly and the change-out assembly are mechanically attached to the point where the end effector can let go of primary robot grasp point 222. In summary, the entire mate or de-mate process of the blind mate mechanism, which includes electrical, fluid and mechanical connections, is accomplished by driving a single drive bolt 223 of primary robot grasp point 222. Drive bolts 223 in secondary robot grasp points 221 thread into floating nuts (not shown) to further secure the change-out assembly to the bus-side interface assembly. A spring (also not shown, but may be the same as or similar to spring 118 of FIGS. 1A-E) biases drive bolts 223 of secondary robot grasp points 221 away from the floating nuts, and springs 246 bias carriage 240 away from bus-side interface plate 230. In some embodiments, drive bolts 223 for both primary grasp point 222 and secondary grasp points 221 function in the same way. The only difference in some embodiments is that drive bolt 223 in primary grasp point 222 may be longer to accommodate being inserted into carriage 240.

FIGS. 3A-H illustrate fixed side 300 of a robot-driven blind mate mechanism, according to an embodiment of the present invention. In some embodiments, fixed side 300 may be fixed side 104 of FIGS. 1A-E. Fixed side 300 includes a status indicator 310 (see FIGS. 3A-C and 3H) having a visual target plate 310c and a visual target 310d. In some embodiments, status indicator 310 may be RTL indicator 238 of FIGS. 2A-F. Screws 310a and washers 310b hold visual target plate 310c in place.

Legs 310e pivot on bushings (not visible) that are held in place by screws 310f. Legs are shown in the down position. Torsional springs 310g bias respective legs 310e up, hiding a black line 310h on the round part of leg 310e when in the up position. When the removable side (e.g., removable side 102 of FIGS. 1A-E) is being seated on fixed side 300, the removable side pushes legs 310e down, revealing black line 310h. Once the removable side is fully (and correctly) seated, black lines 310h on each leg 310e align with black line 310i on the "RTL" decals. There are two legs 310e to make sure the removable side is not racked/cocked, which can be difficult to discern with the robot vision cameras if no indicators are present. For example, if only one indicator lines up, the removable side is not seated squarely on fixed side 300.

Figure 3A:
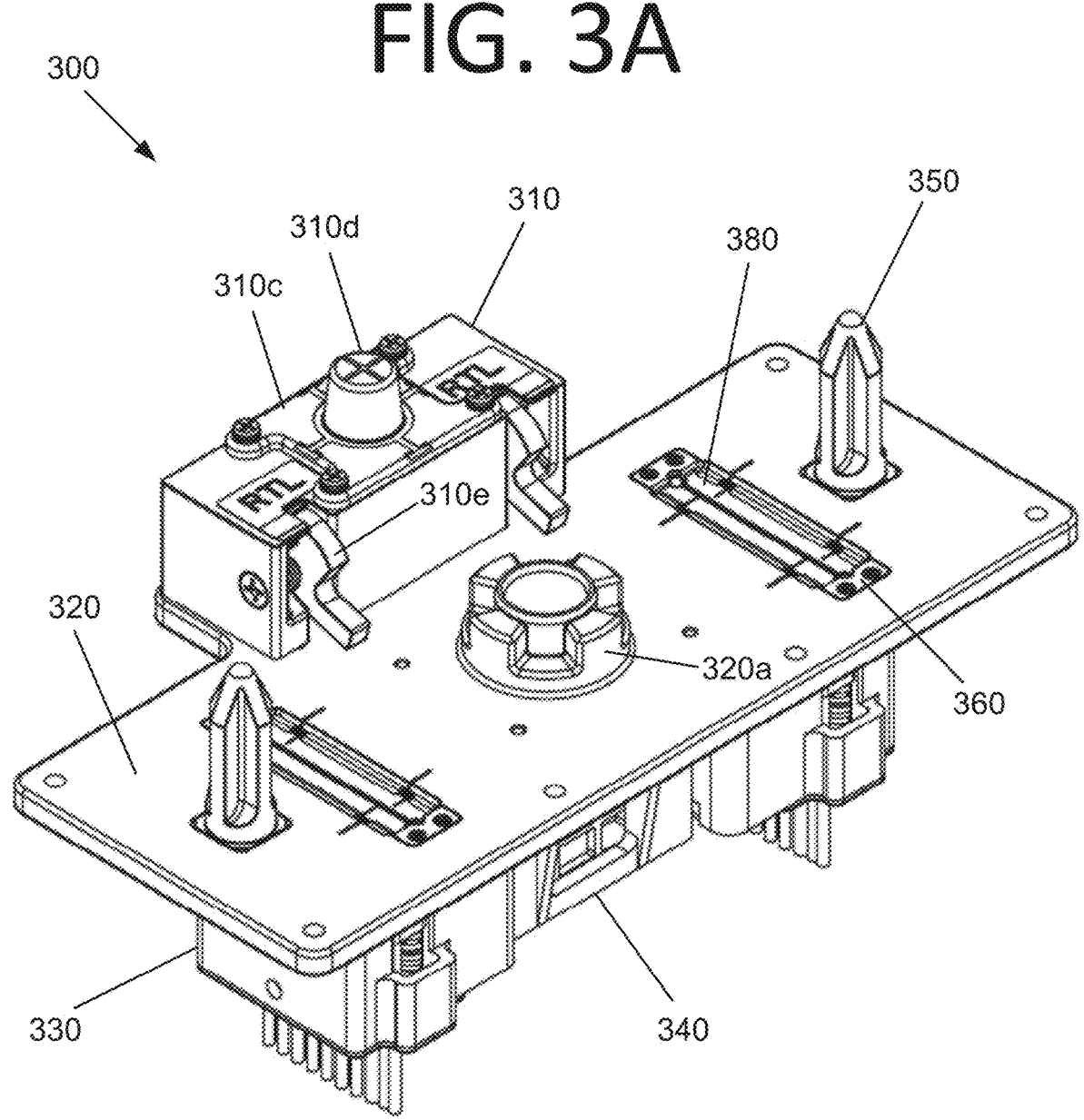
FIG. 3A is a top perspective view illustrating a fixed side of a robot-driven blind mate mechanism in an unmated configuration, according to an embodiment of the present invention.
Figure 3B:
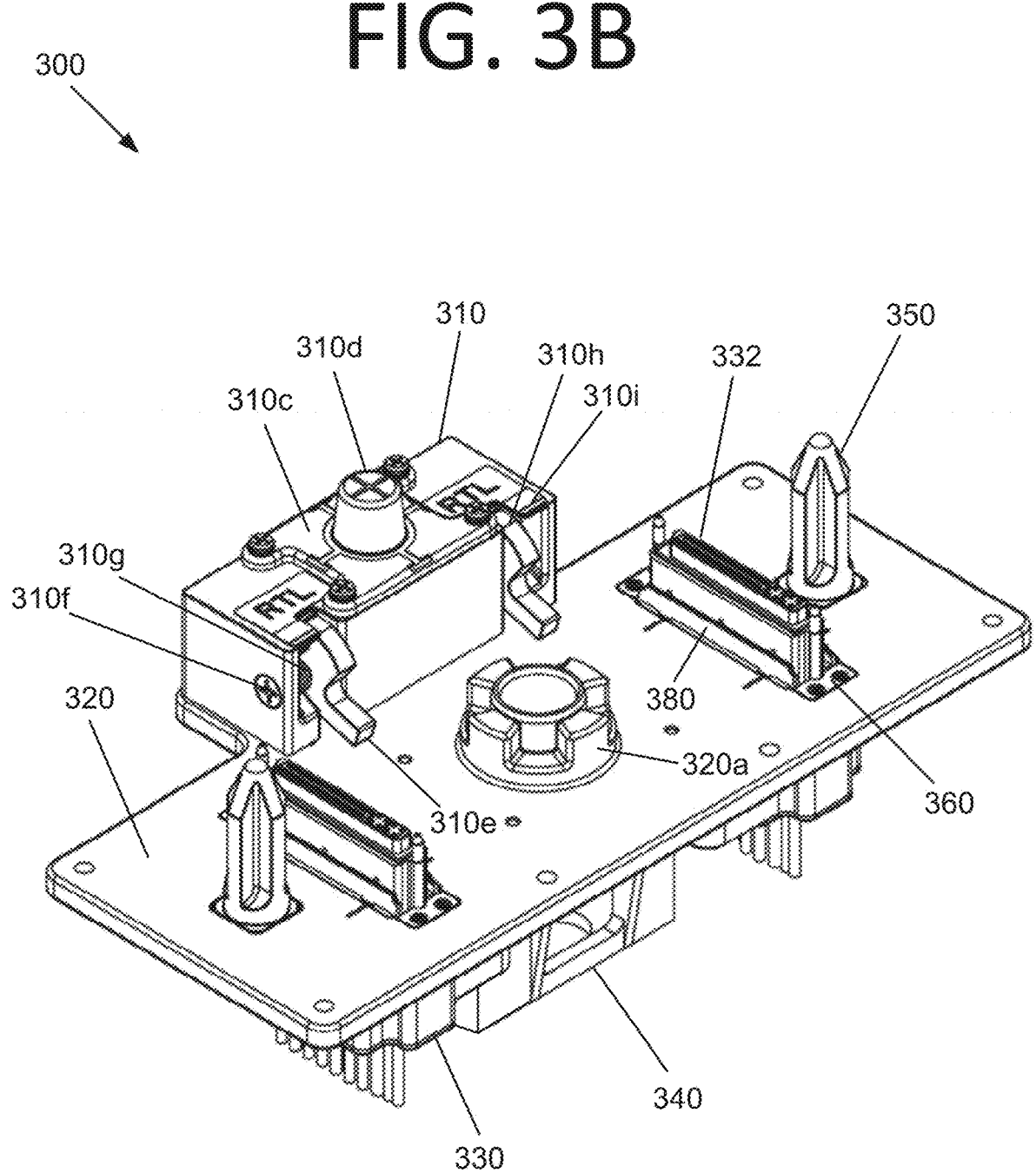
FIG. 3B is a top perspective view illustrating the fixed side of the robot-driven blind mate mechanism in a mated configuration, according to an embodiment of the present invention.
Figure 3D:
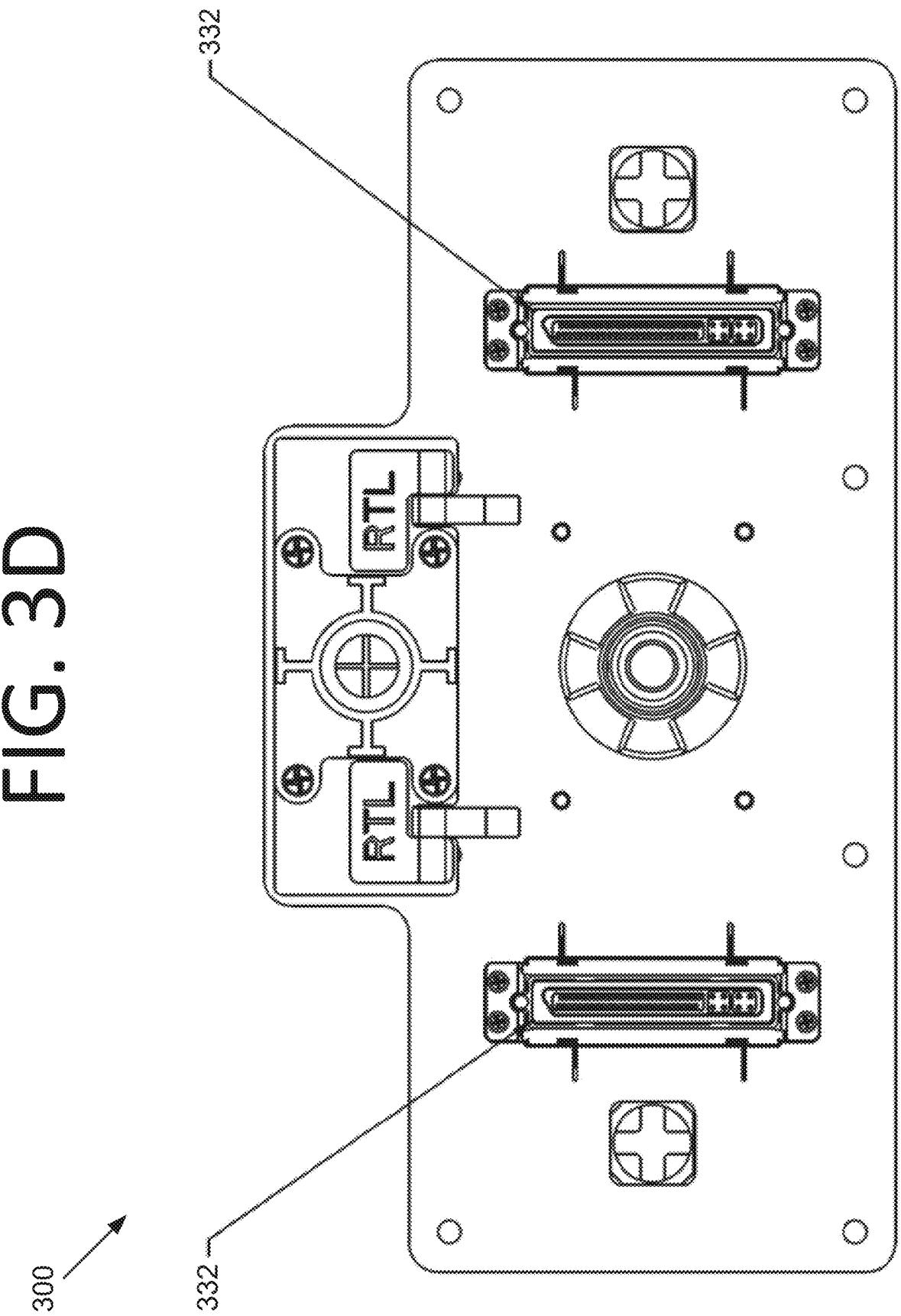
FIG. 3D is a top view illustrating the mounting pad and the status indicator in the mated configuration, according to an embodiment of the present invention.
Figure 3E:
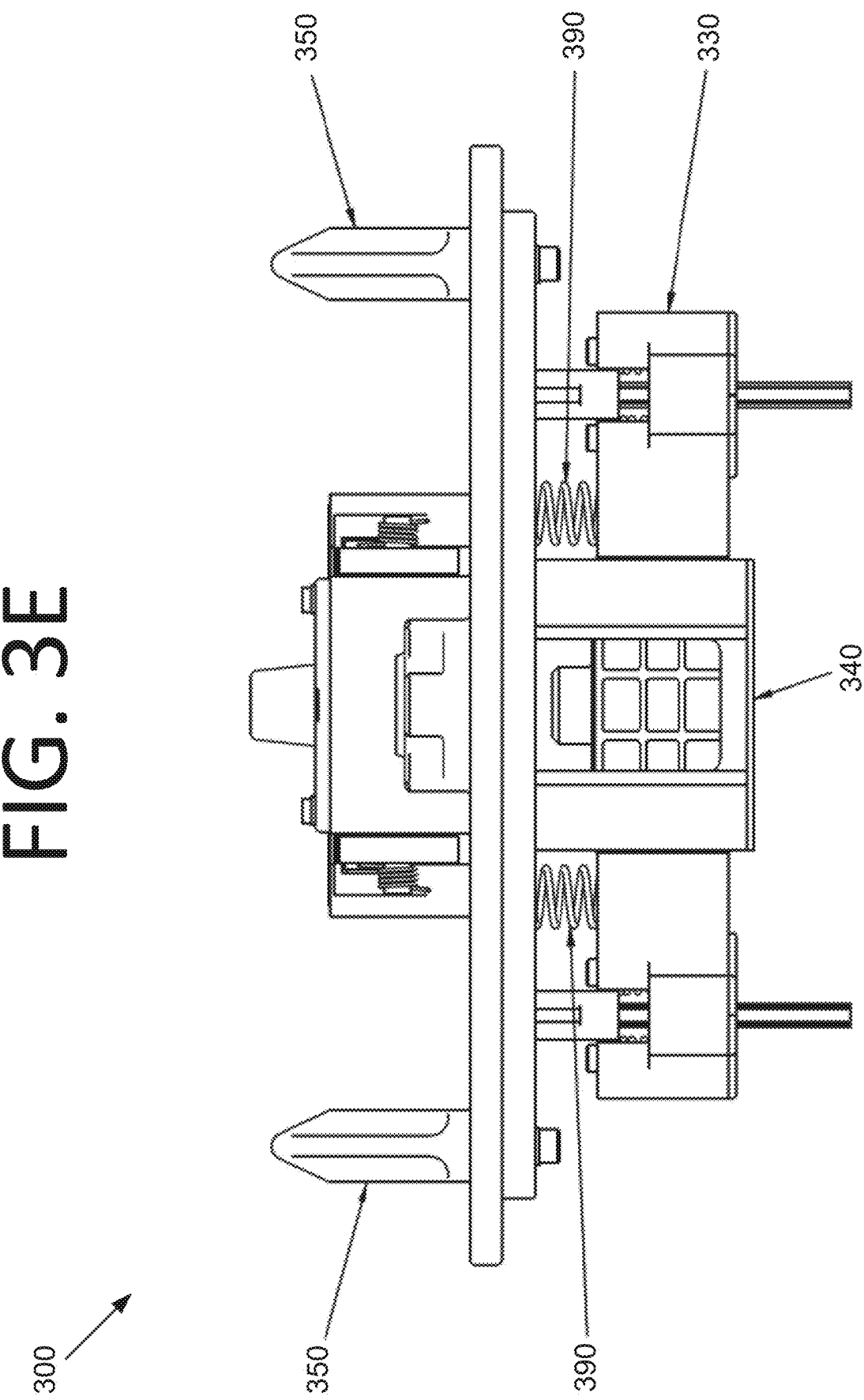
FIG. 3E is a side view illustrating the fixed side of the robot-driven blind mate mechanism in the unmated configuration, according to an embodiment of the present invention.
Figure 3F:
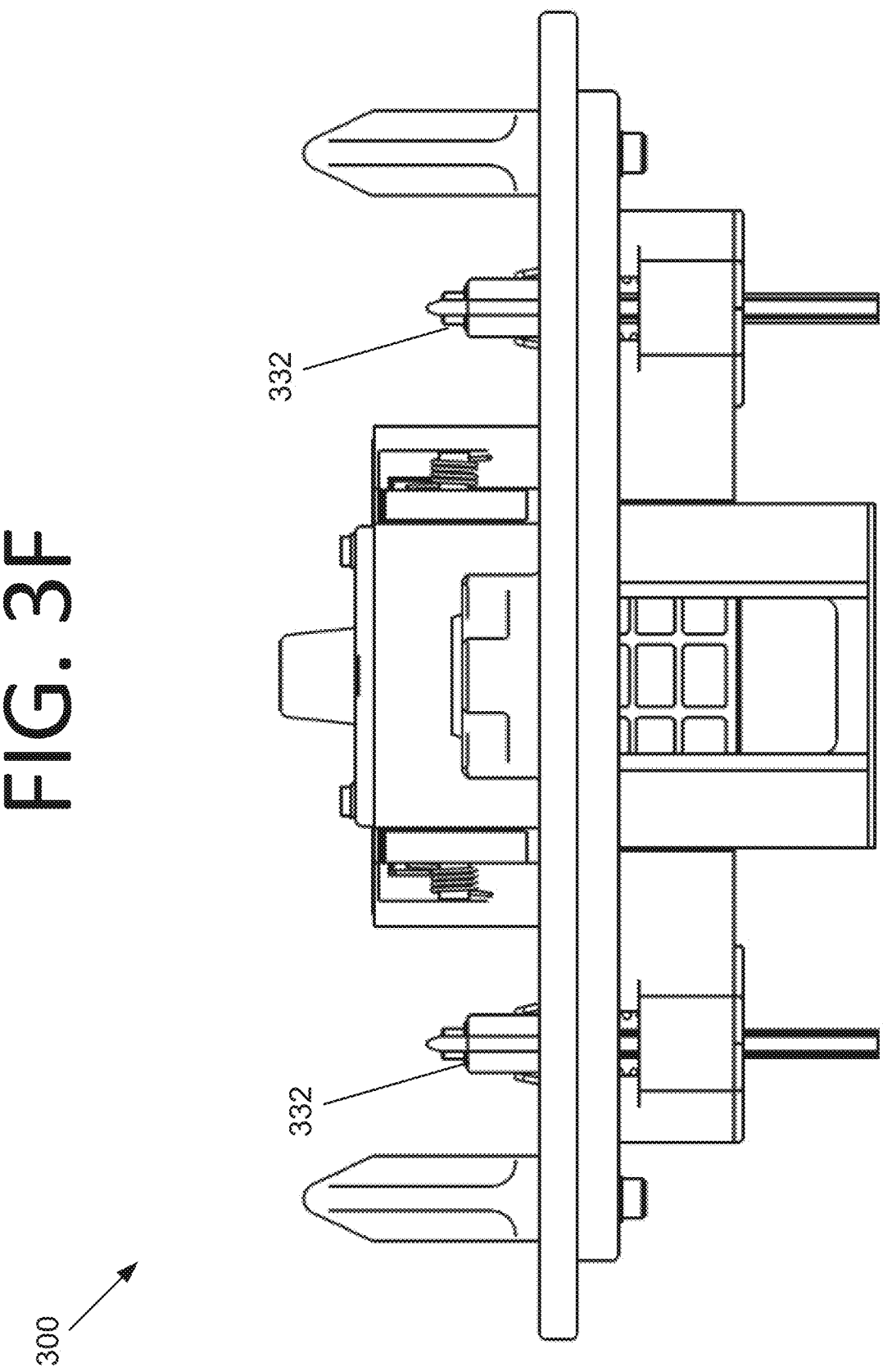
FIG. 3F is a side view illustrating the fixed side of the robot-driven blind mate mechanism in the mated configuration, according to an embodiment of the present invention.
Figure 3G:
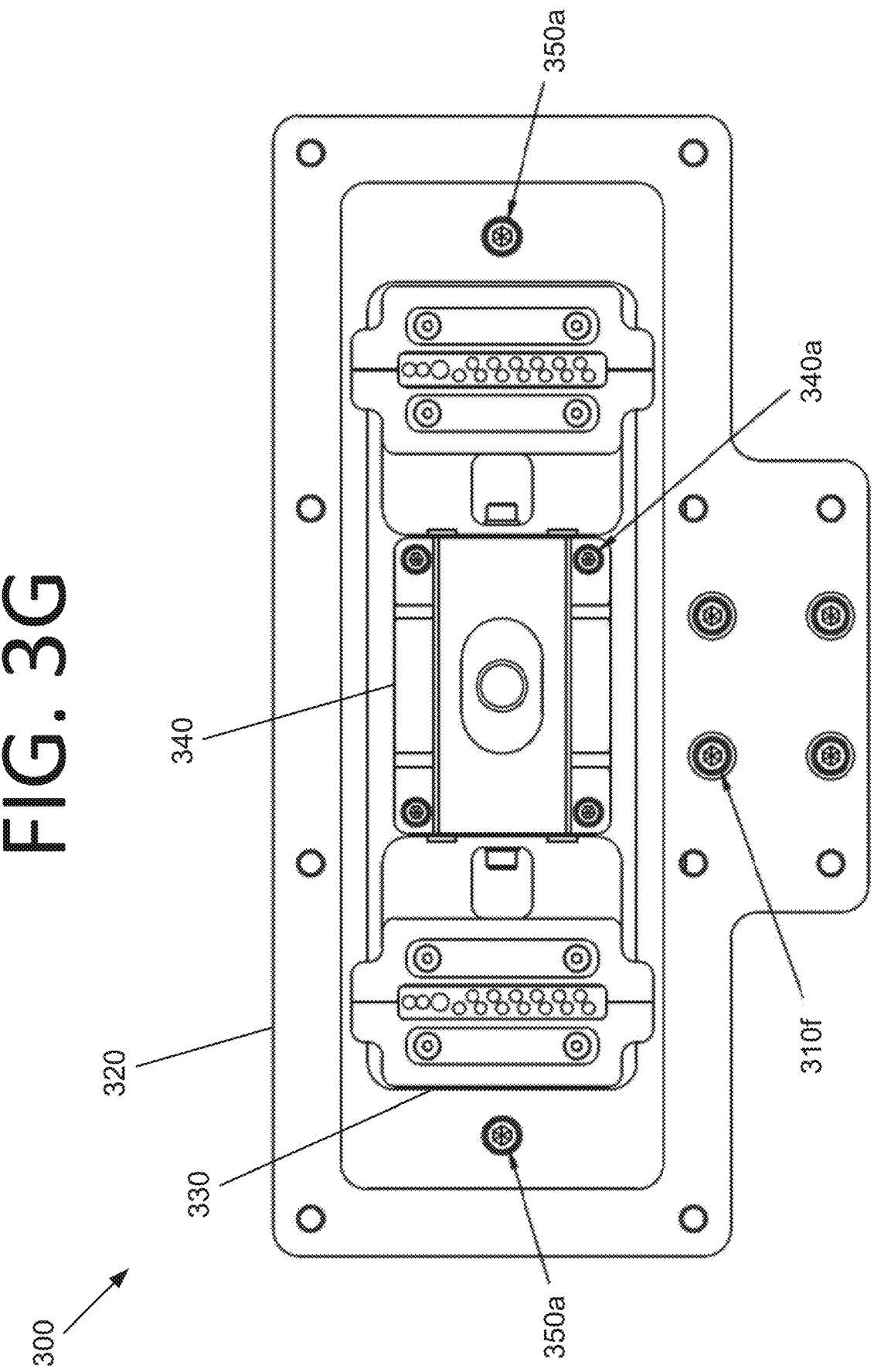
FIG. 3G is a bottom view illustrating the fixed side of the robot-driven blind mate mechanism, according to an embodiment of the present invention.
Figure 3H:
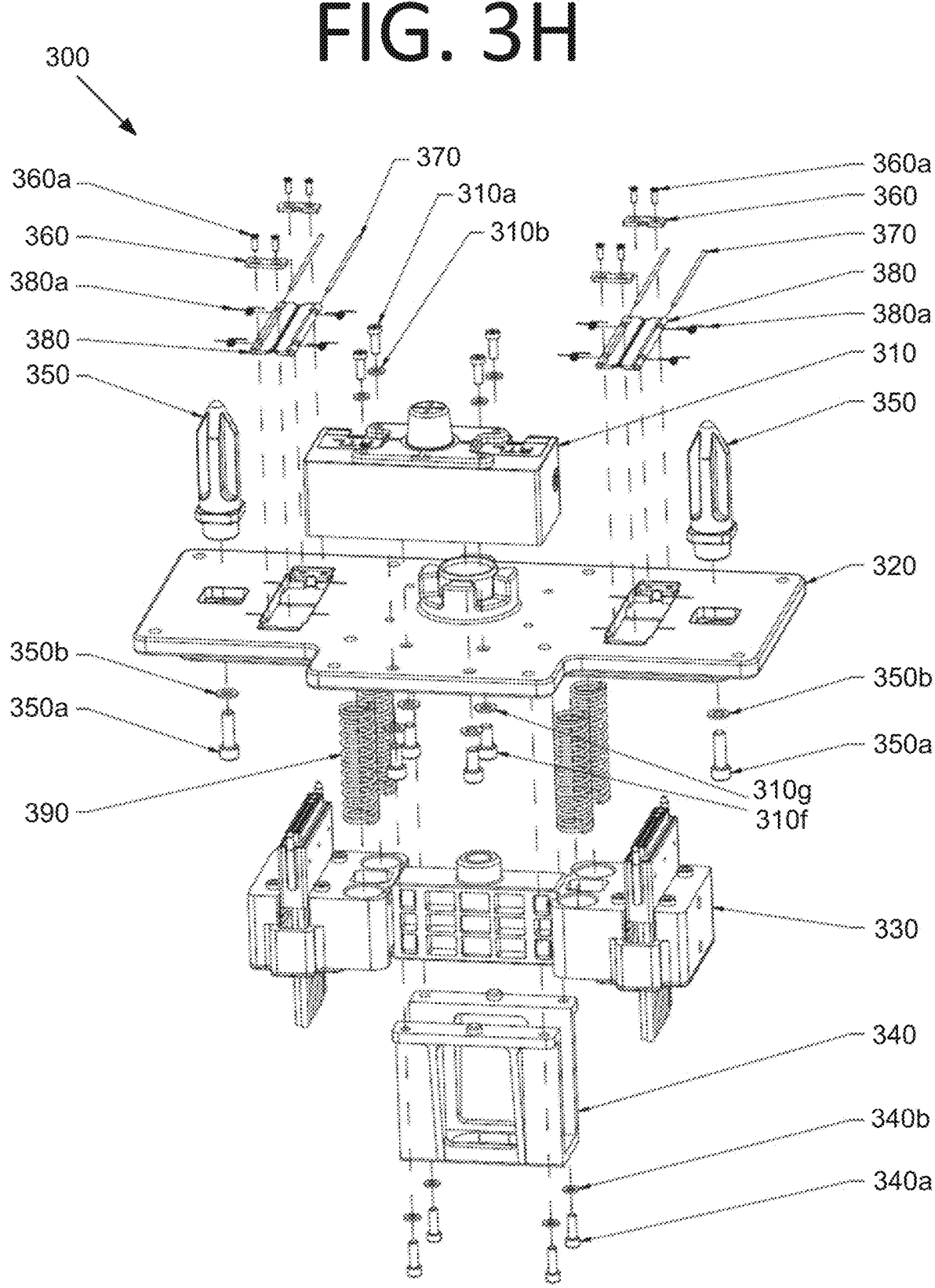
FIG. 3H is an exploded view illustrating the fixed side of the robot-driven blind mate mechanism, according to an embodiment of the present invention.
Figure 3I:
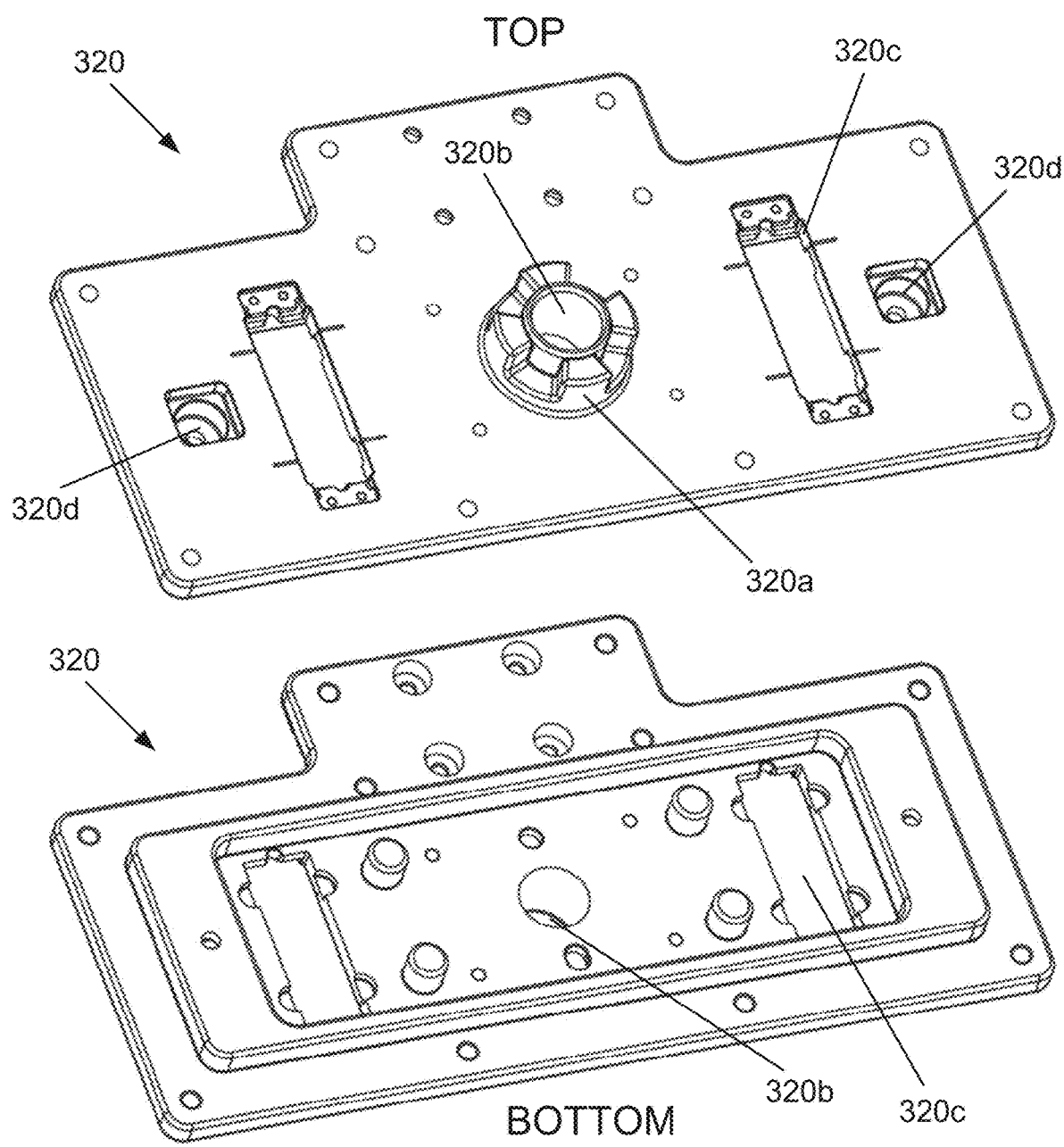
FIG. 3I illustrates top and bottom views of the mounting pad, according to an embodiment of the present invention.
Figure 3J:
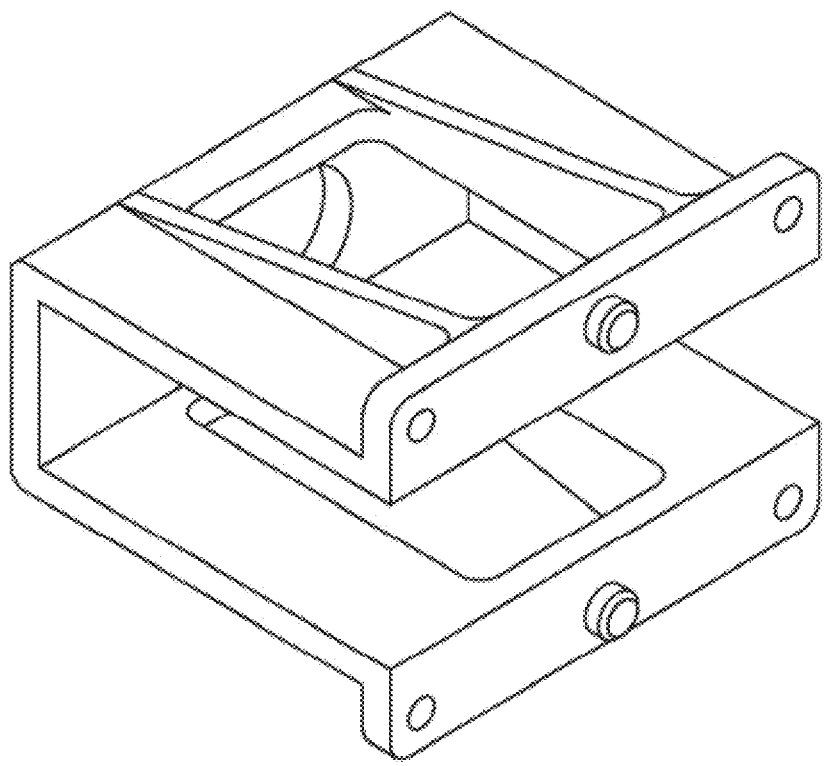
FIG. 3J is a perspective view illustrating a carriage retainer, according to an embodiment of the present invention.
Figure 3K:
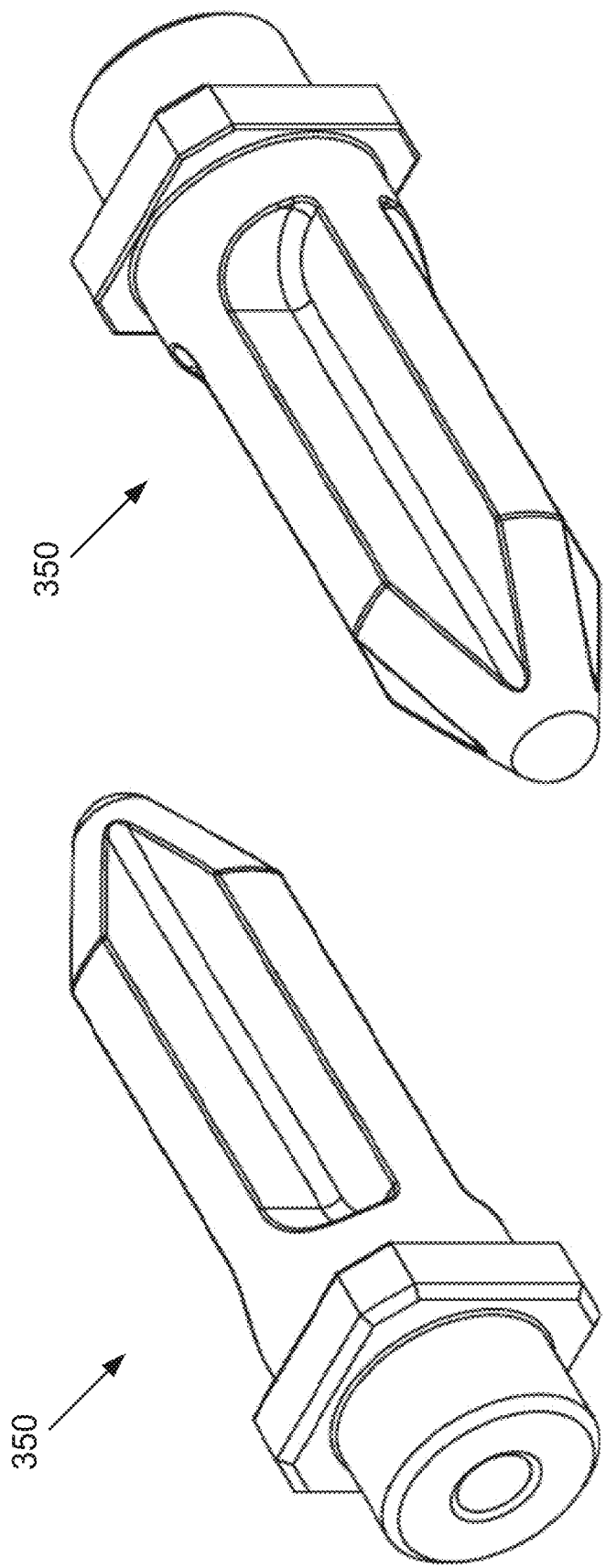
FIG. 3K illustrates perspective views of a course alignment pin, according to an embodiment of the present invention.
Figure 3L:
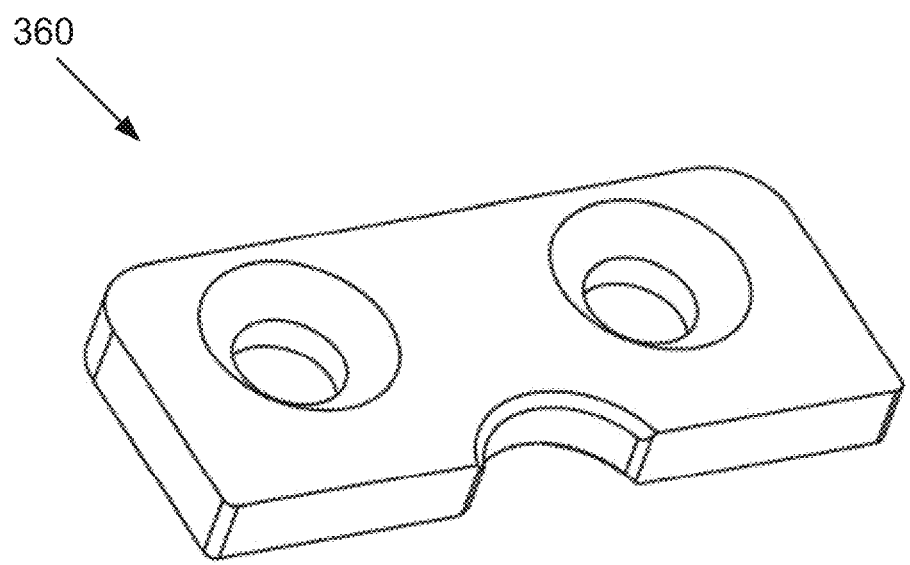
FIG. 3L is a perspective view illustrating a pin retainer, according to an embodiment of the present invention.
Figure 3N:
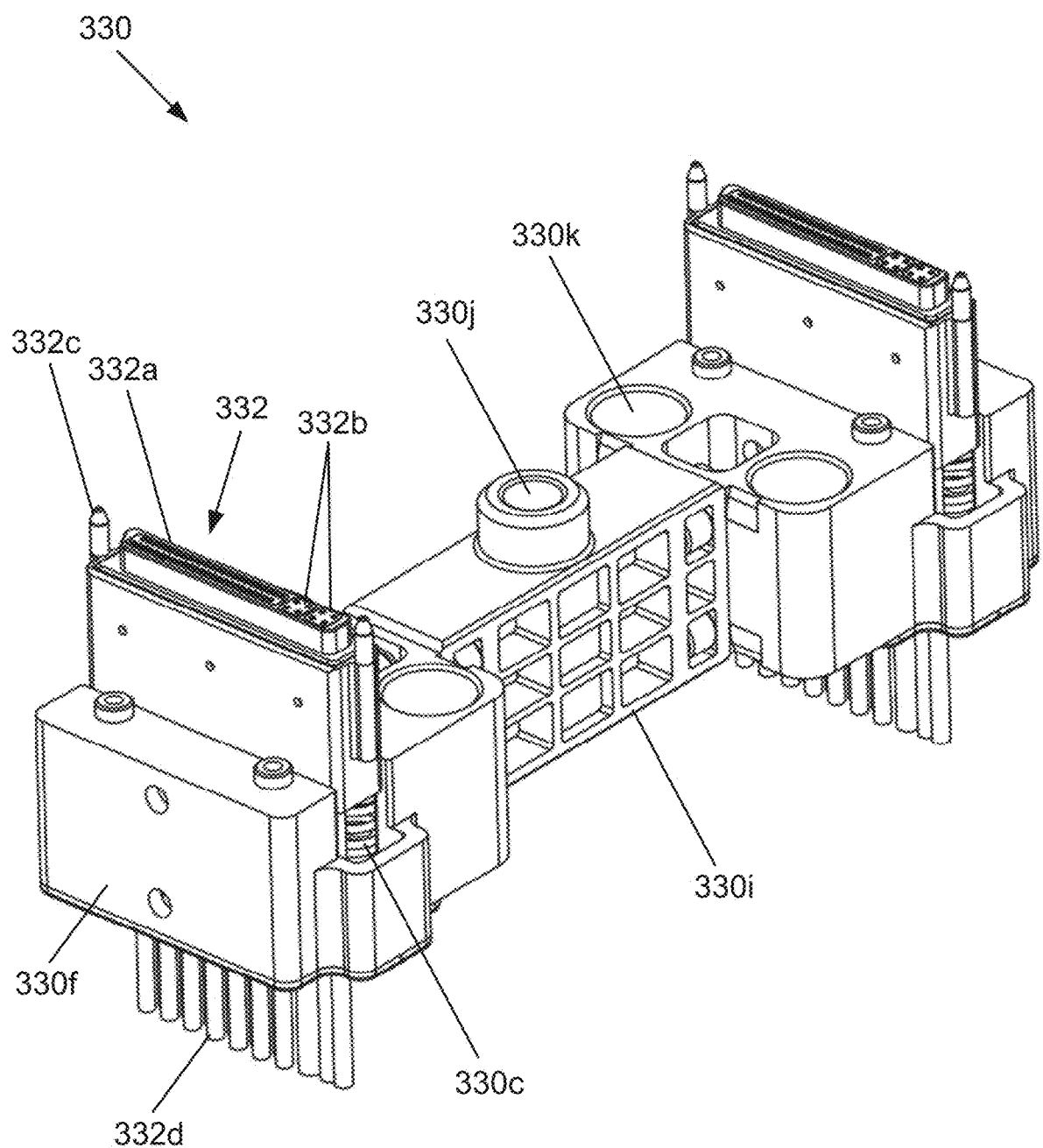
FIG. 3N is a top perspective view illustrating a carriage, according to an embodiment of the present invention.
Figure 30:
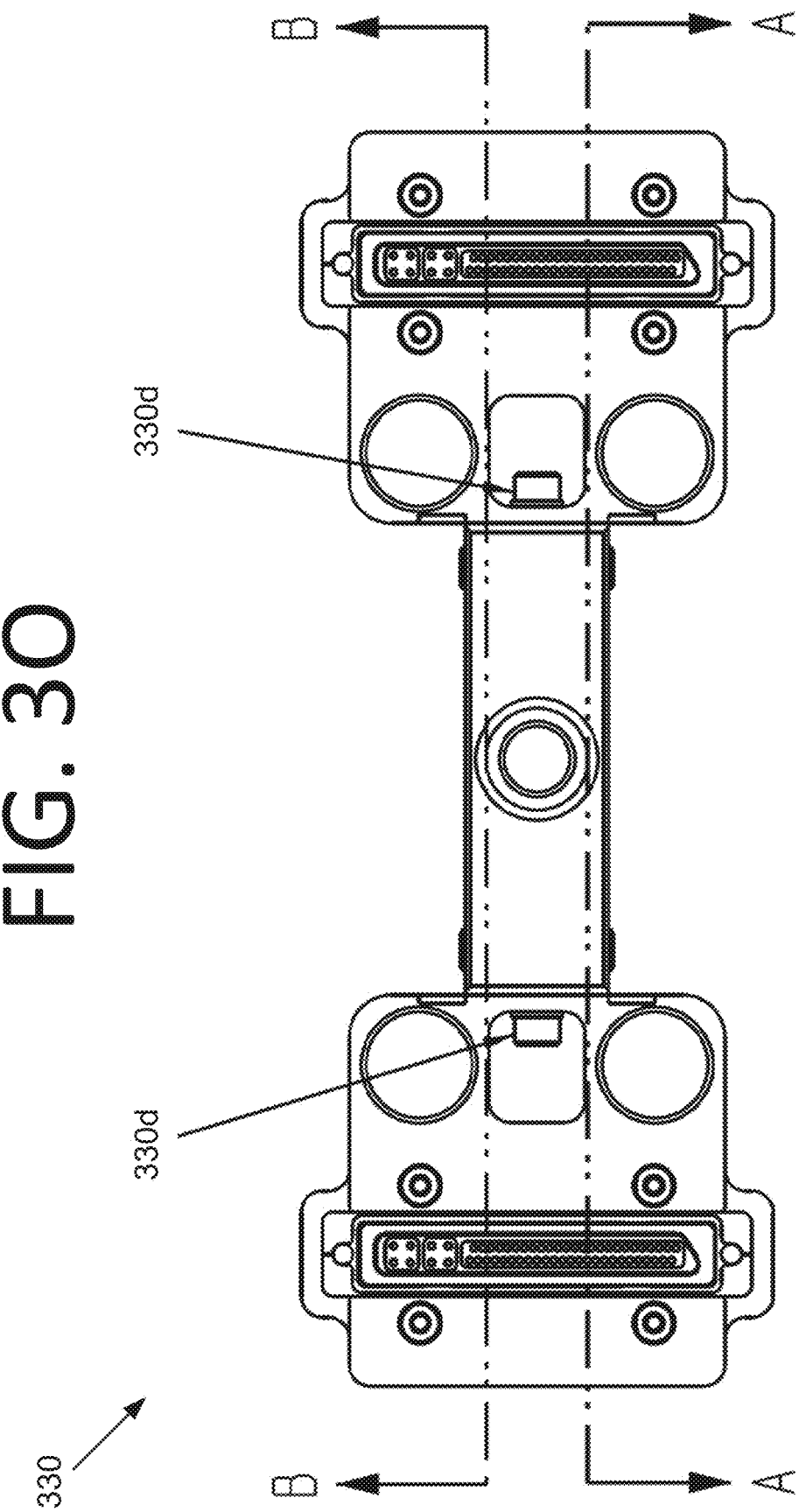
Figure 3P:
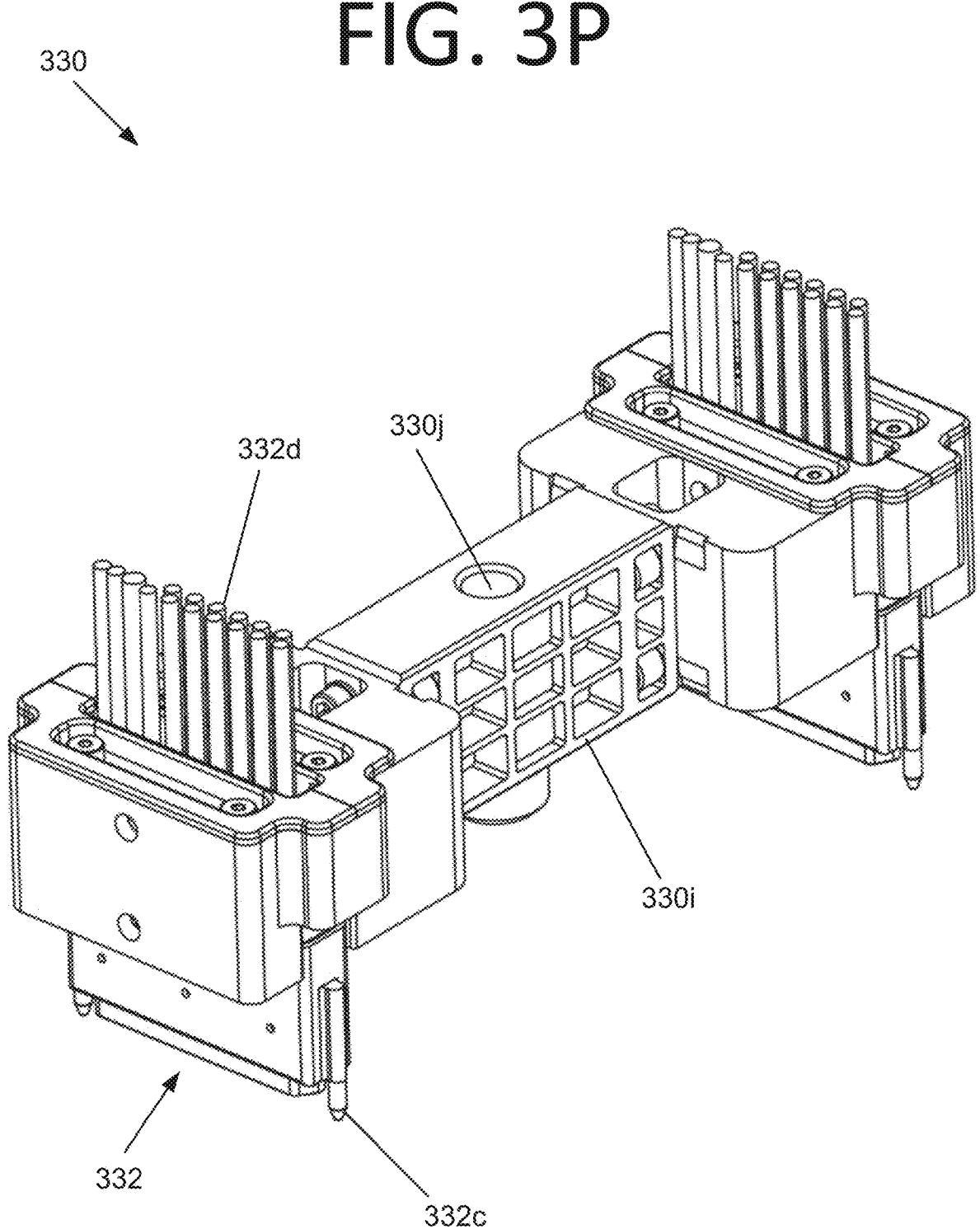
FIG. 3P is a bottom perspective view illustrating a carriage, according to an embodiment of the present invention.
Figure 3Q:
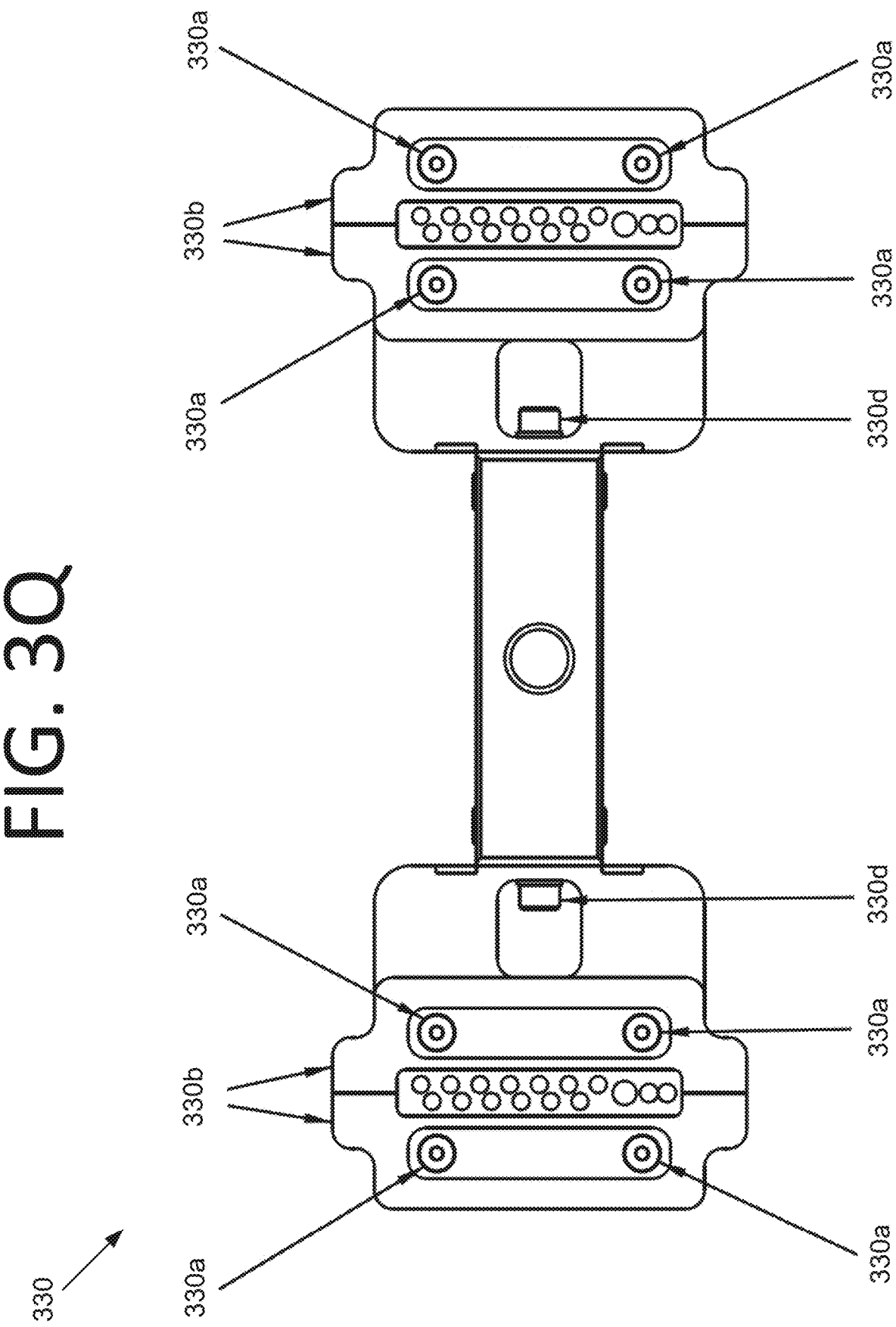
FIG. 3Q is a bottom view illustrating the carriage, according to an embodiment of the present invention.
Figure 3R:
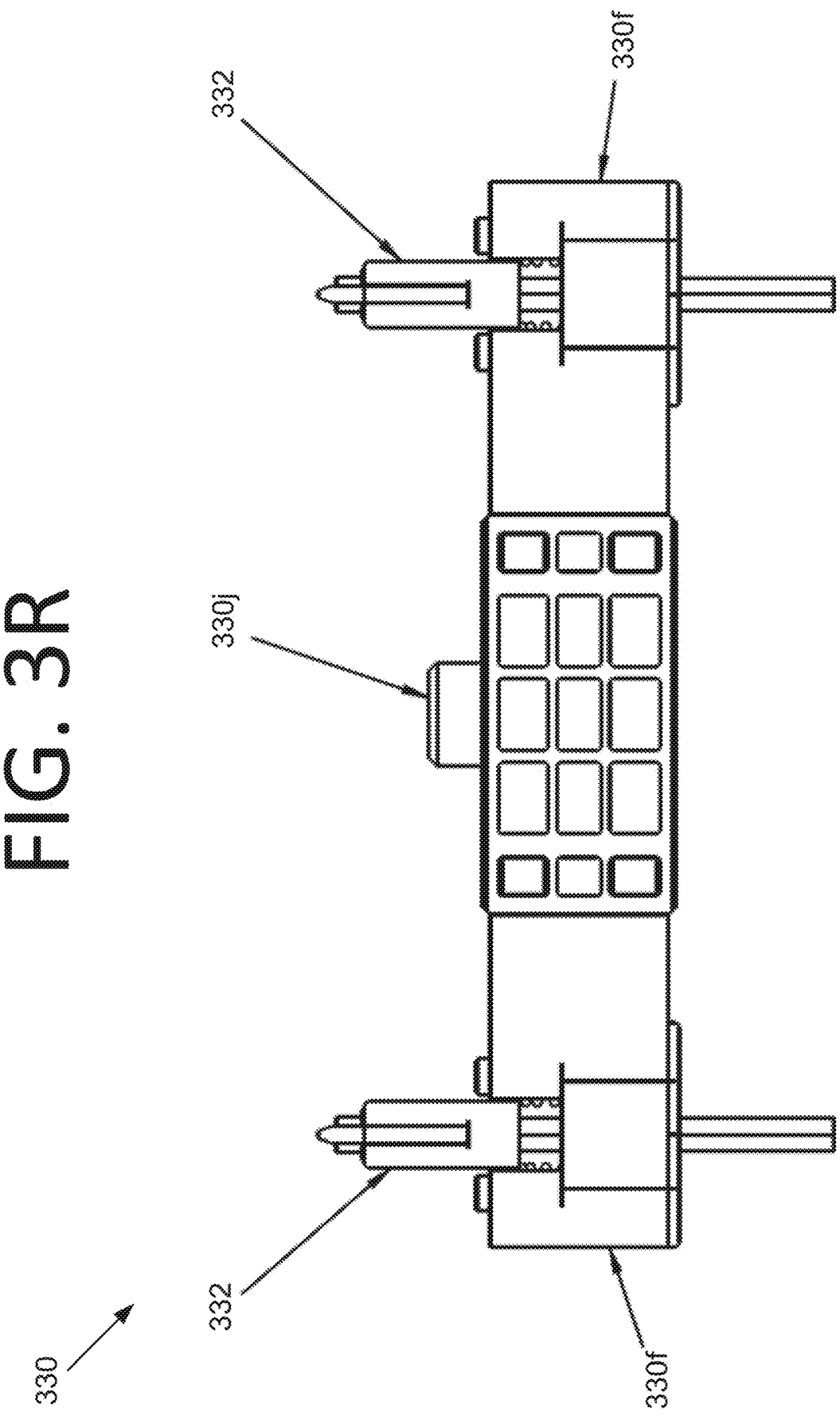
FIG. 3R is a side view illustrating the carriage, according to an embodiment of the present invention.
Figure 3S:
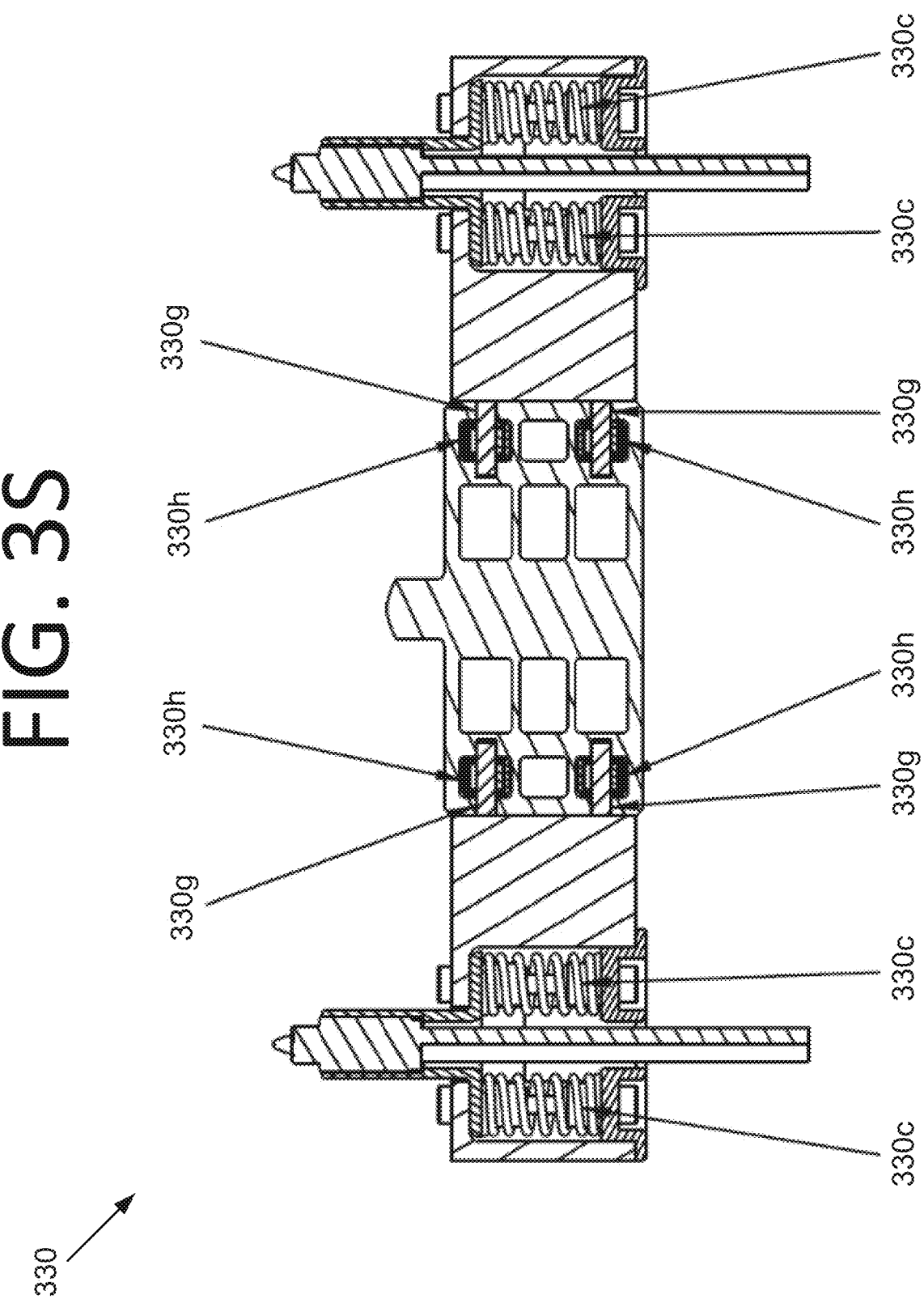
FIG. 3S is a side cutaway view illustrating the carriage with respect to axis A-A from FIG. 3O, according to an embodiment of the present invention.
Figure 3T:
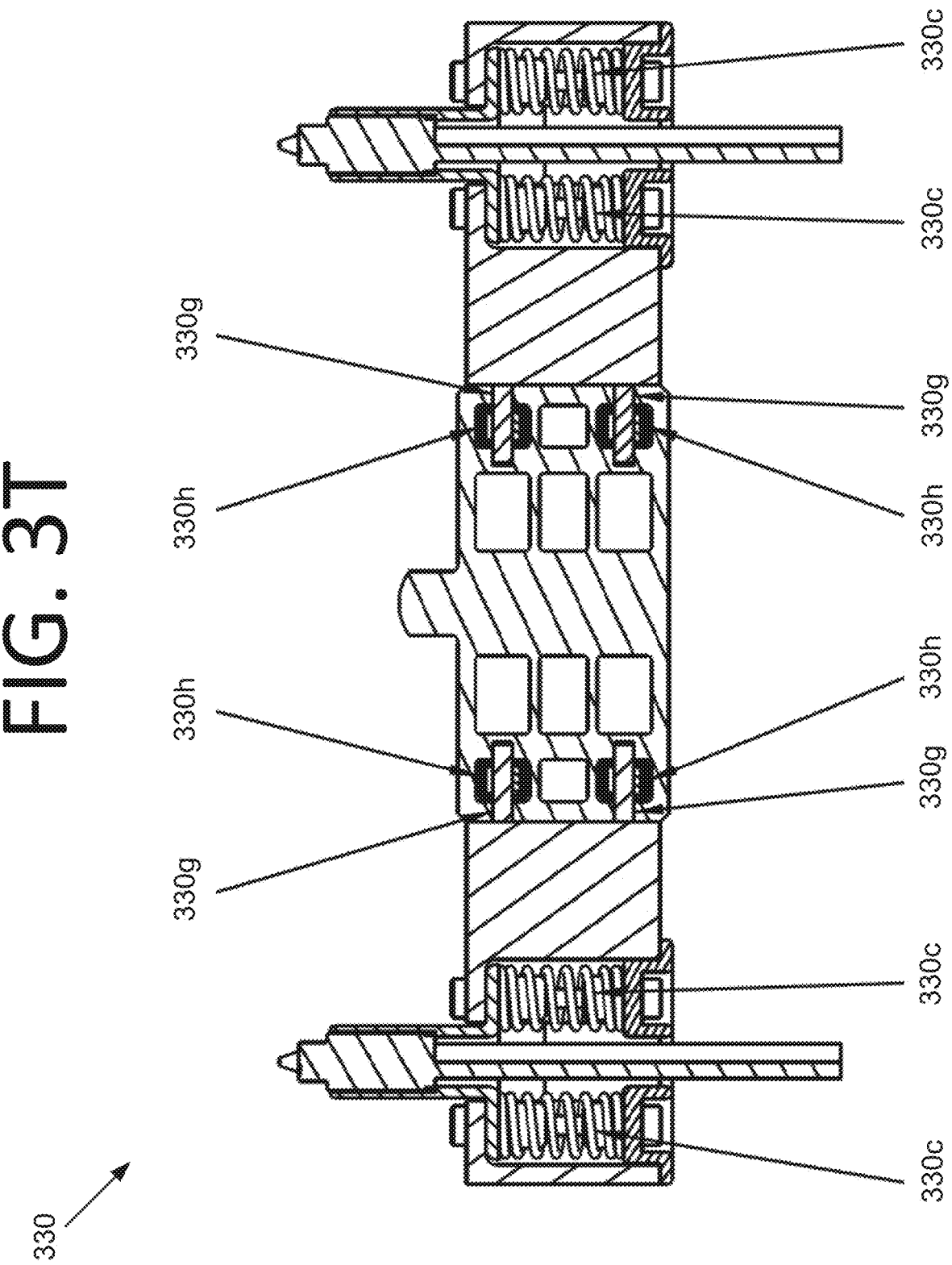
FIG. 3T is a side cutaway view illustrating the carriage with respect to axis B-B from FIG. 3O, according to an embodiment of the present invention.
Figure 3U:
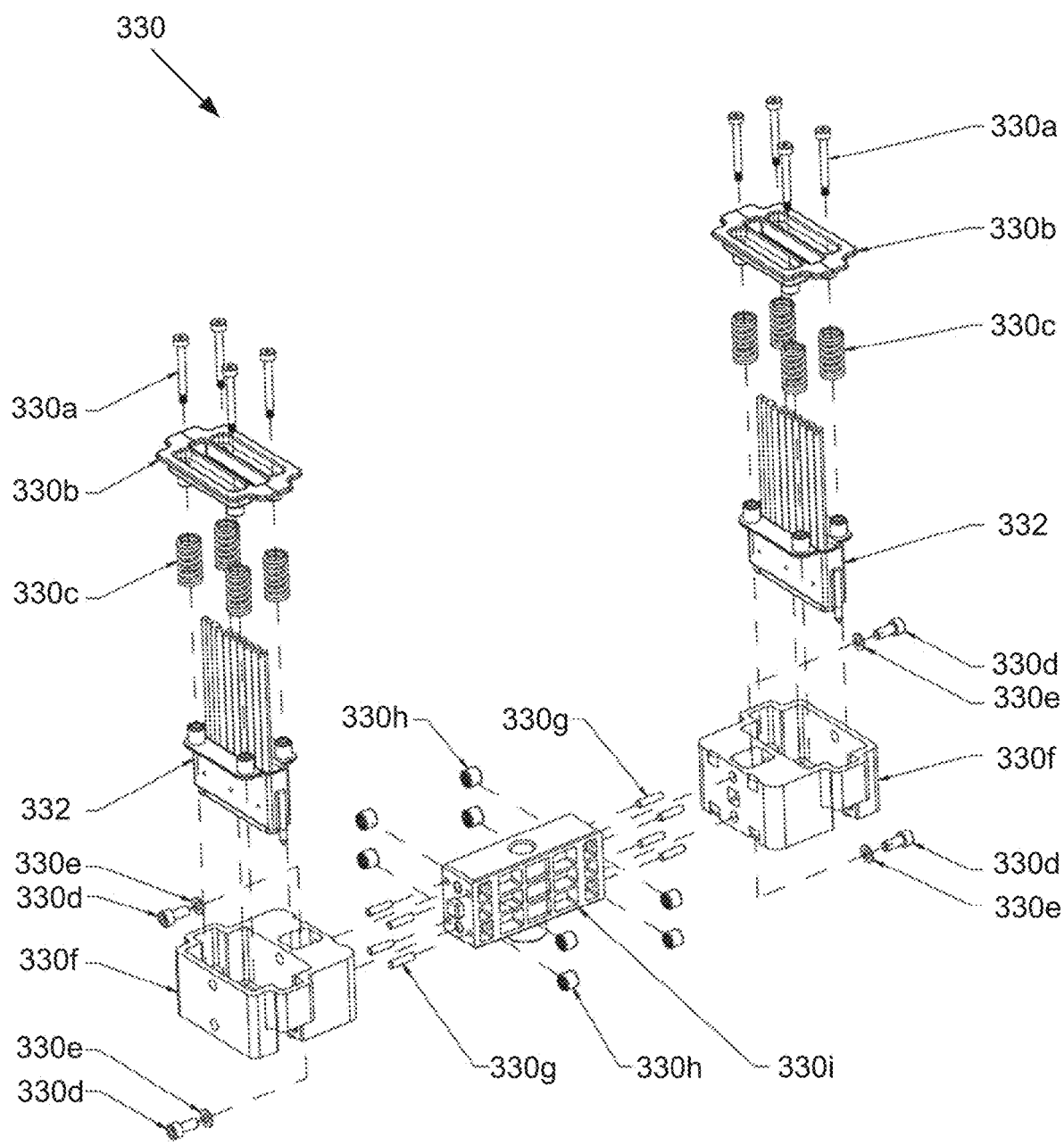
FIG. 3U is an exploded view illustrating the carriage, according to an embodiment of the present invention.
Figure 3V:
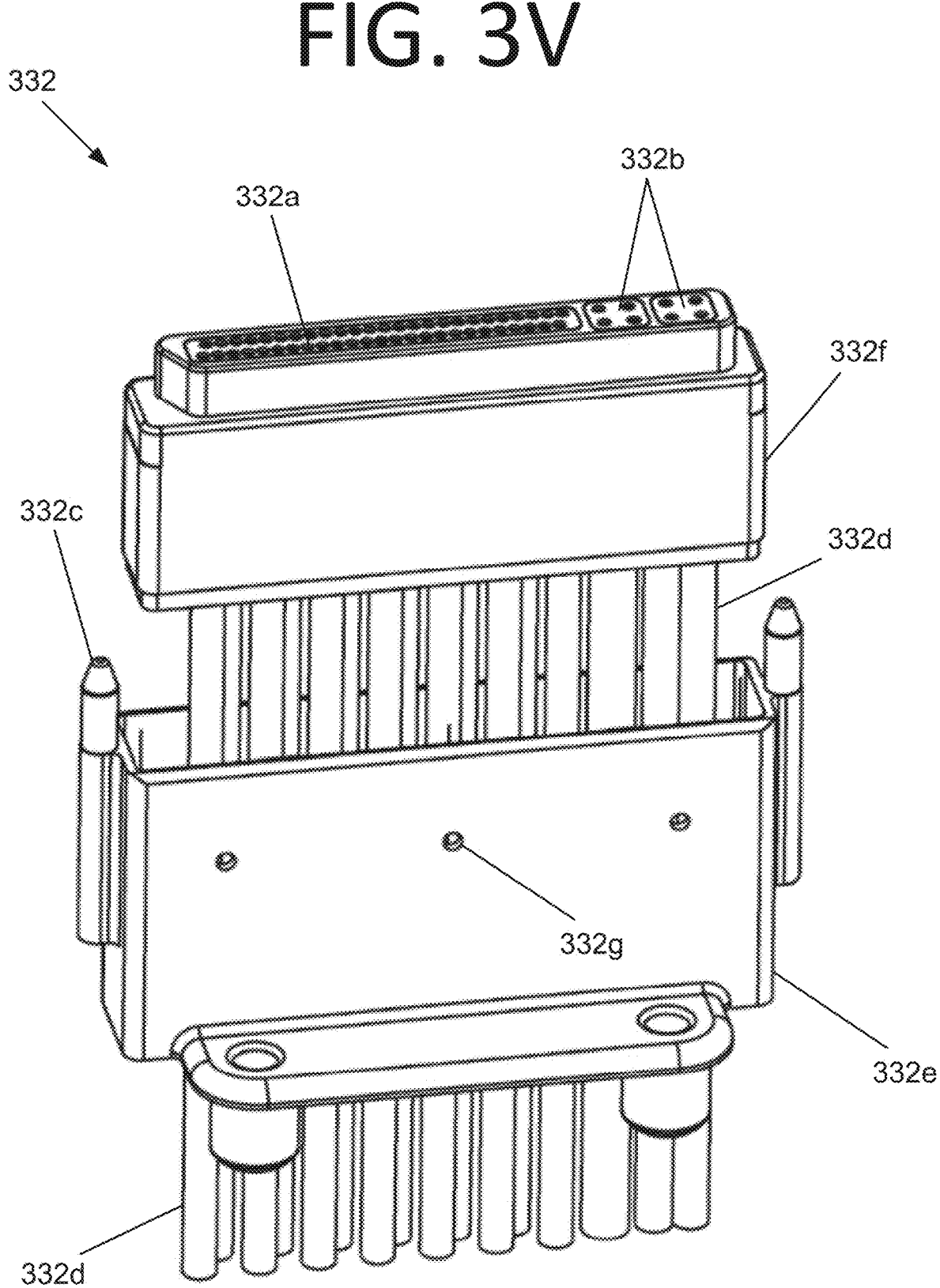
FIG. 3V is a separated view illustrating a female electrical connector, according to an embodiment of the present invention.

A mounting pad 320 (see FIGS. 3A-D, 3H, and 3I) provides a platform for mounting other components, such as status indicator 300 via screws 310f and washers 310g (see FIGS. 3G and 3H), carriage retainer 340 via screws 340a and washers 340b (see FIGS. 3H and 3J), and coarse alignment pins 350 via screws 350a and washers 350b (see FIGS. 3H and 3K). Turning to FIG. 3I, fine alignment feature 320a (e.g., a boss, such as the depicted cruciform boss) of mounting pad 320 has a hole 320b that can receive a drive bold (not shown). This allows the drive bolt to pass through mounting pad 320 to engage partly threaded interface 330j on carriage 330. A circular boss near partly threaded interface 330*j* seats into this hole (see, for example, FIG. 1E). A female connector flap mount 320*c* provides a location to mount pin retainers 360 via screws 360*a* (see FIGS. 3C and 3L) holding pins 370 in place that, in turn, retain flaps 380 (see FIGS. 3C and 3M). Torsion springs 380*a* keep flaps 380 closed when a female connector 332 is not protruding therethrough, as shown in FIGS. 3A, 3C, and 3E, for example. Female connectors 332 protruding through flap mount 320*c* and flaps 380 is shown in FIGS. 3B, 3D, and 3F.

Compression springs 390 push carriage 330 away from mounting pad 320 such that a force must be applied by an actuator mechanism (not shown), for example, to move carriage 330 towards mounting pad 320. See FIGS. 3E and 3F, for example. Carriage retainer 340 helps to hold a carriage 330 in place so it is otherwise restrained, but can move towards mounting pad 320 in the same direction as the orientation of coarse alignment pins 350 in FIGS. 3A-F.

FIGS. 3N-V illustrate carriage 330 and female connectors 332 in more detail. Female connectors 332 include electrical sockets 332*a*, 332*b* that are configured to carry electrical signals and/or power. For instance, sockets 332*b* may carry data signals at a higher speed than sockets 332*a*. Pins 332*c* provide additional fine alignment in concert with corresponding holes in a male connector (e.g., male electrical connector 440 of FIG. 4B), ensuring that the connectors are precisely aligned before the delicate electrical pins of the male electrical connector touch respective sockets 332*a*, 332*b* in female electrical connector 332. Wires 332*d* carry signals to sockets 332*a*, 332*b*. Connector housing 332*e* houses connector head 332*f*. Connector housing 332*e* and connector head 332*f* are bonded in this embodiment via epoxy that is inserted through injection holes 332*g*. In some embodiments, commercially available space-rated connectors may be used.

Lateral float may be established by the fit and tolerance of female connectors 332 in carriage 330, as well as the pin/hole clearance of pins 332*c*. Such additional fine alignment features enable mating of connector pins/sockets without ridged misalignment that could result in bending or damaging electrical pins/sockets within the electrical connector. This additional fine alignment allows connectors to be used that have more delicate pins/sockets and/or connectors with higher pin/socket density.

Carriage housings 330*f* house respective female connectors 332, which are biased away from carriage housings 330*f* via compression springs 330*c*. Carriage housings 330*f* also house one end of compression springs 390 via compression spring holes 330*k*. A drive bolt receiving bridge 330*i* connects to carriage housings 330*f* via screws 330*d* and washers 330*e*. Drive bolt receiving bridge 330*i* also has a partly threaded interface 330*j* that can receive a drive bolt.

Metal cylinders 330*h* act like a wheel and surround needle roller bearings, and pins 330*g* act as a shaft. Metal cylinders 330*h* allow carriage 330 to "roll" up and down along carriage retainer 340 rather than sliding along that surface. This reduces frictional losses in the mechanism, therefore reducing the required input torque to the drive bolt. The metal cylinder has the correct size to control the gap between carriage 330 and carriage retainer 340 when metal cylinders 330*h* contact carriage retainer 340.

Screws 330*a* mount carriage housing covers 330*b* to connectors 332. Compression springs 330*c* surround screws 330*a* and extend between carriage housing covers 330*b* and female connectors 332. Thus, springs 330*c* provide overtravel protection for their respective female connectors 332.

FIG. 4A is a bottom view illustrating a removable side 400 of a robot-driven blind mate mechanism that contacts the fixed side when being mated, according to an embodiment of the present invention. Removable side 400 includes holes 410 for coarse alignment features of the fixed side (e.g., fixed side 300 of FIGS. 3A-H). Dust/debris gates 420 for electrical connectors and a drive bolt 430 are also included.

In this embodiment, a cruciform cutout 450 surrounds drive bolt 430. This is the fine alignment feature for the removable side that mates with a fine alignment feature of the fixed side (e.g., fine alignment feature 320*a* of mounting pad 320). Also, two partial cutouts 460 on the upper edge of removable side 400 in this embodiment push legs of a status indicator down (e.g., legs 310*e* of status indicator 310). Partial cutouts 460 are at an angle so the legs rest flat on the surface of partial cutouts 460 when removable side 460 is mated to the fixed side, rather than on a sharp edge.

Figure 4B:
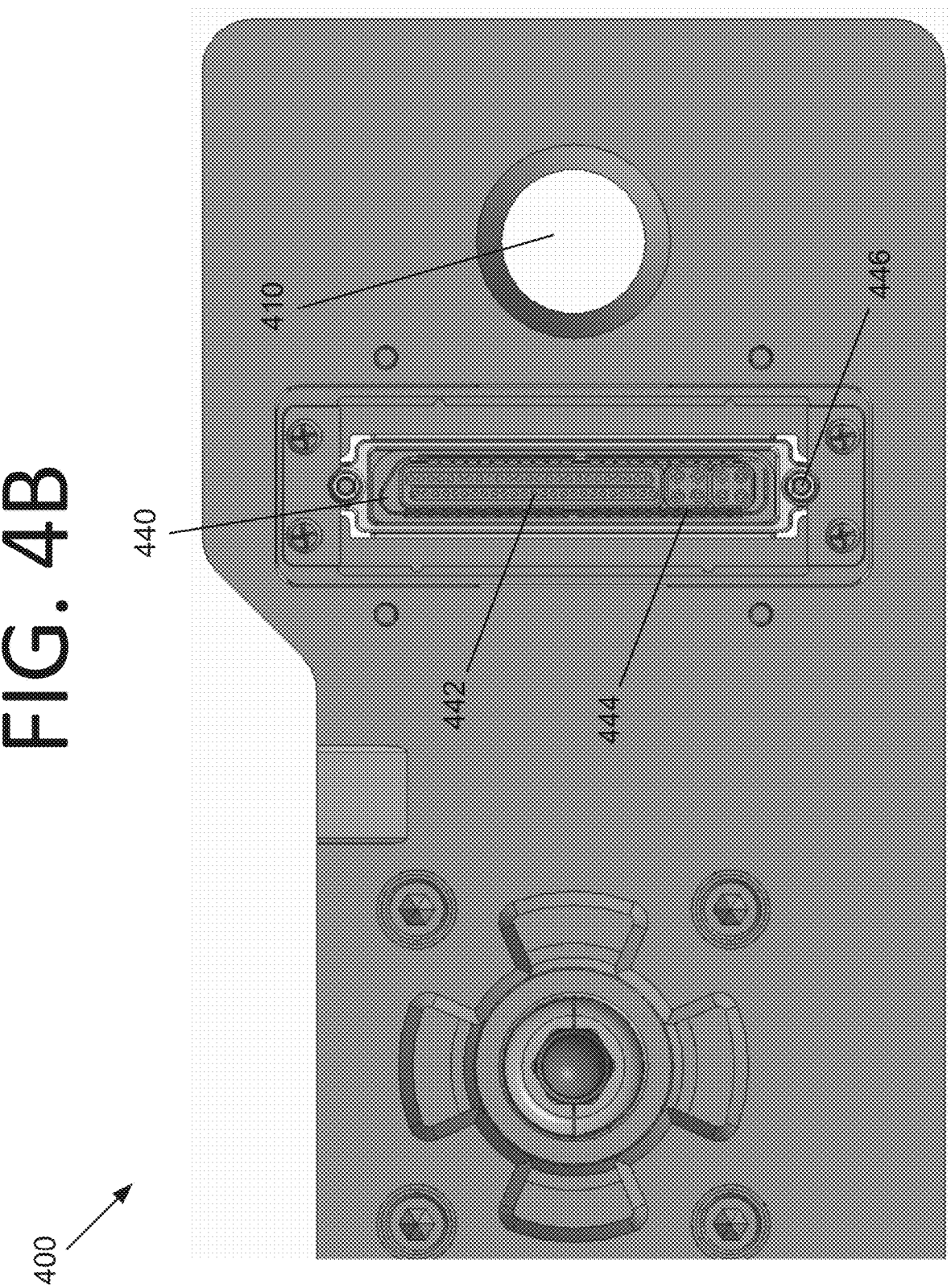
FIG. 4B is an enlarged view of the removable side of the robot-driven blind mate mechanism of FIG. 4A with the dust/debris gate removed, according to an embodiment of the present invention.

As seen in FIG. 4B with dust/debris gate 420 removed, fixed side 400 includes male electrical connectors 440. Pins 442, 444 of male electrical connectors 440 are designed to fit into sockets in corresponding female electrical connectors. For instance, Pins 442, 444 may match sockets 332*a*, 332*b* of female electrical connector 332 in some embodiments. Holes 446 provide fine connector alignment in concert with corresponding pins (e.g., pins 332*c*) from the female electrical connector.

FIG. 5 is a perspective view illustrating a robot 500 configured to interface with a robot grasp point 530 of a change-out assembly (e.g., a removable side of a robot driven blind mate mechanism), according to an embodiment of the present invention. Robot 500 includes a robotic arm 510 (e.g., a space-rated six-axis robot) and an end effector 520. End effector 520 includes a tool change-out mechanism 522 that allows the tool used by the robot to be changed and a tool 524 that engages with robot grasp point 530 and drives drive bolt 532. In some embodiments, tool change-out mechanism 522 includes the motorized components (not shown) of end effector 520 including, but not limited to, a rotary drive, a linear drive, and/or a gripper designed to grasp fixtures. In certain embodiments, tool change-out mechanism 522 may include a video camera (not shown).

By actuating the rotary drive, a collet (not shown) on the end of tool 524 closes on robot grasp point 530. Once firmly attached to robot grasp point 530, the linear drive may be actuated, allowing tool 524 to engage drive bolt 532. Actuating the rotary drive again fastens or loosens drive bolt 532.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A blind mate mechanism, comprising:
   a removable side, comprising
   a drive bolt, and
   one or more first connectors; and
   a fixed side operably connected to a device to be serviced, the fixed side comprising:
   a threaded receiving interface configured to receive the drive bolt, and
   one or more second connectors configured to connect with the one or more first connectors, wherein
   the removable side is configured to be mated with the fixed side and de-mated with the fixed side, and
   the fixed side and the removable side are configured to facilitate mechanical and structural connections, transfer of fluids, transfer of communications signals, transfer of power, or any combination thereof, between the fixed side and the removable side via the one or more first connectors and the one or more second connectors when the fixed side and the removable side are mated; wherein
   the fixed side further comprises a carriage and a carriage retainer, and
   the carriage comprises cylinders surrounding needle roller bearings mounted with pins, the cylinders configured to allow the carriage to roll up and down along the carriage retainer.

2. The blind mate mechanism of claim 1, wherein the removable side and the fixed side further comprise dust/debris gates for the one or more first connectors and the one or more second connectors, respectively.

3. The blind mate mechanism of claim 1, further comprising:
   a coarse alignment feature comprising projections on the fixed side and corresponding holes on the removable side, or vice versa; and
   a fine alignment feature comprising a cutout on the removable side and a corresponding boss on the fixed side, or vice versa.

4. The blind mate mechanism of claim 1, wherein the fixed side further comprises:
   a carriage configured to carry the one or more second connectors and to allow the drive bolt to drive the one or more first connectors and the one or more second connectors together in the mated configuration.

5. The blind mate mechanism of claim 4, wherein
   the fixed side further comprises a fine alignment feature comprising pins, and
   the carriage further comprises carriage return springs operably connected to the fine alignment feature.

6. The blind mate mechanism of claim 1, further comprising:
   connector over-travel protectors comprising lower movement limiting posts, upper movement limiting posts, and springs, the connector over-travel protectors configured to prevent the one or more second connectors from overextension or overcompression.

7. The blind mate mechanism of claim 1, wherein the fixed side further comprises:
   a status indicator comprising legs biased by springs, the status indicator configured to indicate when the fixed side and the removable side are properly aligned.

8. The blind mate mechanism of claim 1, wherein the fixed side further comprises:
   coarse alignment pins;
   a carriage;
   a carriage retainer configured to restrict movement of the carriage;
   a mounting pad comprising a hole through which the drive bolt passes when the fixed side and the removable side are mated; and
   compression springs operably connected to the mounting pad and the carriage, wherein
   the coarse alignment pins and the carriage retainer are operably connected to the mounting pad.

9. The blind mate mechanism of claim 1, wherein the one or more first connectors or the one or more second connectors comprise female electrical connectors, the female electrical connectors comprising:
   electrical sockets configured to carry electrical signals and/or power;
   wires corresponding to the electrical sockets; and
   pins that facilitate connector alignment in concert with corresponding holes in a male connector.

10. The blind mate mechanism of claim 9, wherein
    the fixed side further comprises a carriage, and
    the fixed side provides lateral float for the one or more second connectors.

11. The blind mate mechanism of claim 1, wherein the fixed side further comprises:
    one or more dust/debris gates for the one or more first connectors, wherein
    the one or more first connectors are male connectors comprising holes that facilitate connector alignment in concert with corresponding pins in a female connector.

12. The apparatus of claim 1, further comprising:
    one or more dust/debris gates for the one or more connectors, wherein the one or more connectors are male connectors comprising holes that facilitate connector alignment in concert with corresponding pins in a female connector.

13. A blind mate mechanism, comprising:
a removable side, comprising:
a drive bolt, and
one or more first connectors; and
a fixed side operably connected to a device to be serviced, the fixed side comprising:
a threaded receiving interface configured to receive the drive bolt, and
one or more second connectors configured to connect with the one or more first connectors, wherein
the removable side is configured to be mated with the fixed side and de-mated with the fixed side, and
the fixed side and the removable side are configured to facilitate mechanical and structural connections, transfer of fluids, transfer of communications signals, transfer of power, or any combination thereof, between the fixed side and the removable side via the one or more first connectors and the one or more second connectors when the fixed side and the removable side are mated; wherein
the removable side further comprises a drive bolt housing that houses the drive bolt, and
the drive bolt further comprises:
a retainer configured to retain the drive bolt within the drive bolt housing,
a stopping projection configured to contact a narrowing portion of the drive bolt housing, limiting how far the drive bolt can extend, and
a spring located between the stopping projection and the narrowing part of the drive bolt housing, the spring biasing the drive bolt such that the drive bolt rests on the retainer until the removable side and the fixed side are to be mated.

14. An apparatus, comprising:
a threaded receiving interface configured to receive a drive bolt;
one or more connectors;
a carriage comprising a threaded receiving interface configured to receive the drive bolt; and
connector over-travel protectors configured to prevent the one or more connectors from overextension or overcompression; and
a carriage retainer, wherein the carriage comprises cylinders surrounding needle roller bearings mounted with pins, the cylinders configured to allow the carriage to roll up and down along the carriage retainer.

15. The apparatus of claim 14, further comprising:
coarse alignment pins;
a carriage retainer configured to restrict movement of the carriage;
a mounting pad; and
compression springs operably connected to the mounting pad and the carriage, wherein
the coarse alignment pins and the carriage retainer are operably connected to the mounting pad.

16. The apparatus of claim 14, wherein the apparatus provides lateral float for the one or more connectors.

17. The apparatus of claim 14, wherein the one or more connectors comprise female electrical connectors, the female electrical connectors comprising:
electrical sockets configured to carry electrical signals and/or power;
wires corresponding to the electrical sockets; and
pins that facilitate connector alignment in concert with corresponding holes in a male connector.

* * * * *